(12) United States Patent
O'Donnell et al.

(10) Patent No.: US 10,926,930 B2
(45) Date of Patent: *Feb. 23, 2021

(54) FLEXIBLE PACKAGES WITH SELF-FOLDING

(71) Applicant: The Procter & Gamble Company, Cincinnati, OH (US)

(72) Inventors: Hugh Joseph O'Donnell, Cincinnati, OH (US); Michael Remus, Schwalbach am Taunus (DE); Neil John Rogers, Vilvoorde (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,924

(22) Filed: Dec. 18, 2019

(65) Prior Publication Data

US 2020/0255197 A1 Aug. 13, 2020

Related U.S. Application Data

(63) Continuation of application No. 15/988,021, filed on May 24, 2018, now Pat. No. 10,549,896.

(Continued)

(51) Int. Cl.
*B65D 65/12* (2006.01)
*B65D 75/20* (2006.01)
(Continued)

(52) U.S. Cl.
CPC .............. *B65D 65/12* (2013.01); *B31B 70/00* (2017.08); *B31B 70/26* (2017.08); *B65B 43/04* (2013.01); *B65B 61/02* (2013.01); *B65B 61/24* (2013.01); *B65D 65/06* (2013.01); *B65D 75/20* (2013.01); *B65D 75/245* (2013.01); *B65D 75/52* (2013.01); *B65D 75/58* (2013.01); *B31B 2155/0014* (2017.08); *B31B 2160/20* (2017.08); *B32B 27/08* (2013.01); *B32B 38/1825* (2013.01); *B32B 2439/06* (2013.01); *B32B 2553/00* (2013.01); *B65B 2220/18* (2013.01)

(58) Field of Classification Search
CPC ........ B65D 65/12; B65D 65/06; B65D 75/20; B65D 75/245; B65D 75/52; B65D 75/58
USPC ......................................................... 206/451
See application file for complete search history.

(56) References Cited

U.S. PATENT DOCUMENTS 4,076,121 A 2/1978 Clayton et al.
4,903,841 A 2/1990 Ohsima et al.
(Continued)

FOREIGN PATENT DOCUMENTS

EP 0620156 10/1994
EP 0681970 11/1995
(Continued)

OTHER PUBLICATIONS

Machine translation of EP-2156947-A1.*
(Continued)

*Primary Examiner* — Jes F Pascua
(74) *Attorney, Agent, or Firm* — Daniel S. Albrecht; Jason Jeffrey Camp

(57) ABSTRACT

Packages made from flexible material, wherein the packages include one or more self-folds formed by applying activation energy to the flexible material.

20 Claims, 21 Drawing Sheets

Related U.S. Application Data

(60) Provisional application No. 62/511,459, filed on May 26, 2017.

(51) Int. Cl.

| | | |
|---|---|---|
| *B65D 75/52* | (2006.01) | |
| *B65D 75/58* | (2006.01) | |
| *B31B 70/26* | (2017.01) | |
| *B65B 61/02* | (2006.01) | |
| *B65B 61/24* | (2006.01) | |
| *B65B 43/04* | (2006.01) | |
| *B31B 70/00* | (2017.01) | |
| *B65D 65/06* | (2006.01) | |
| *B65D 75/24* | (2006.01) | |
| *B31B 160/20* | (2017.01) | |
| *B31B 155/00* | (2017.01) | |
| *B32B 27/08* | (2006.01) | |
| *B32B 38/18* | (2006.01) | |

(56) References Cited

U.S. PATENT DOCUMENTS

| | | | |
|---|---|---|---|
| 4,965,126 A | 10/1990 | Abraham et al. | |
| 5,139,832 A * | 8/1992 | Hayashi | B29C 61/003 |
| | | | 264/230 |
| 5,352,043 A | 10/1994 | Takagaki et al. | |
| 6,149,227 A | 11/2000 | Wycech | |
| 6,520,333 B1 | 2/2003 | Tschantz | |
| 7,448,495 B2 | 11/2008 | Sadow | |
| 9,403,617 B2 | 8/2016 | Schneider et al. | |
| 9,695,586 B1 * | 7/2017 | Reading | E04B 1/34357 |
| 9,908,285 B2 * | 3/2018 | Nam | H01L 21/477 |
| 10,549,896 B2 * | 2/2020 | O'Donnell | B65D 75/245 |
| 2003/0002755 A1 | 1/2003 | Kim et al. | |
| 2005/0147329 A1 | 7/2005 | Arvizu | |
| 2005/0152624 A1 | 7/2005 | Versluys | |
| 2005/0199692 A1 | 9/2005 | Nelson et al. | |
| 2008/0011753 A1 * | 1/2008 | Browne | B60R 7/005 |
| | | | 220/260 |
| 2008/0272117 A1 | 11/2008 | Roos et al. | |
| 2009/0311190 A1 * | 12/2009 | Gracias | A61B 6/032 |
| | | | 424/9.3 |
| 2010/0159218 A1 | 6/2010 | Yum | |
| 2010/0260941 A1 | 10/2010 | Bushmire et al. | |
| 2010/0291352 A1 | 11/2010 | Jager | |
| 2010/0301512 A1 * | 12/2010 | Rousseau | B29C 61/06 |
| | | | 264/101 |
| 2010/0326985 A1 | 12/2010 | Lin | |
| 2011/0038571 A1 | 2/2011 | Moehlenbrock | |
| 2011/0052106 A1 | 3/2011 | Holmes et al. | |
| 2011/0097019 A1 | 4/2011 | Moehlenbrock et al. | |
| 2012/0135237 A1 * | 5/2012 | Gracias | B81C 1/00007 |
| | | | 428/402 |
| 2012/0230614 A1 | 9/2012 | Reichert et al. | |
| 2013/0045530 A1 * | 2/2013 | Gracias | B81C 1/00007 |
| | | | 435/289.1 |
| 2013/0095258 A1 * | 4/2013 | Gracias | B32B 3/26 |
| | | | 428/29 |
| 2013/0195382 A1 | 8/2013 | Murray | |
| 2013/0210148 A1 * | 8/2013 | Gracias | H01Q 1/38 |
| | | | 435/396 |
| 2013/0292049 A1 | 11/2013 | Schindler, II | |
| 2014/0033655 A1 | 2/2014 | Stanley et al. | |
| 2014/0117588 A1 | 5/2014 | Schindler, II et al. | |
| 2014/0199002 A1 | 7/2014 | Murray | |
| 2014/0305036 A1 * | 10/2014 | Pretsch | A01G 13/0231 |
| | | | 47/17 |
| 2015/0122842 A1 | 5/2015 | Berg | |
| 2015/0284144 A1 | 10/2015 | Dytchkowskyj | |
| 2016/0137374 A1 * | 5/2016 | Brosch | B65D 75/002 |
| | | | 383/104 |
| 2017/0259961 A1 | 9/2017 | O'Donnell et al. | |
| 2017/0259971 A1 | 9/2017 | O'Donnell et al. | |
| 2017/0259972 A1 | 9/2017 | O'Donnell et al. | |
| 2018/0282041 A1 | 10/2018 | O'Donnell et al. | |
| 2018/0317314 A1 * | 11/2018 | Olberding | H03K 17/962 |
| 2018/0339823 A1 * | 11/2018 | Rogers | B65B 43/06 |

FOREIGN PATENT DOCUMENTS

| | | | | |
|---|---|---|---|---|
| EP | 0997391 | | 5/2000 | |
| EP | 1059243 | A2 | 12/2000 | |
| EP | 1454837 | A1 | 9/2004 | |
| EP | 1970310 | A1 * | 9/2008 | B65B 9/207 |
| EP | 2156947 | A1 * | 2/2010 | B32B 3/30 |
| EP | 2360099 | B1 | 7/2015 | |
| FR | 2990686 | | 11/2013 | |
| JP | 2004299779 | | 10/2004 | |
| WO | WO2017156367 | A1 | 9/2017 | |

OTHER PUBLICATIONS

Machine translation of EP-1970310-A1.*
Office Actions for U.S. Appl. No. 15/935,397.
Office Actions for U.S. Appl. No. 15/987,989.
Search Report and Written Opinion for PCT/US2018/034319 dated Oct. 9, 2018.
Office Actions for U.S. Appl. No. 15/988,035.
Davis, D. et al., "Self-folding of polymer sheets using microwaves and graphene ink," Royal Society of Chemistry Advances, 5, pp. 89254-89261 (Oct. 15, 2015).
Liu, Y., et al., "Three-dimensional folding of pre-strained polymer sheets via absorption of laser light," American Institute of Physics, J. of Applied Physics, vol. 115, No. 20, pp. 204911-1-204911-6 (May 28, 2014).
Office Actions for U.S. Appl. No. 15/988,021.

* cited by examiner

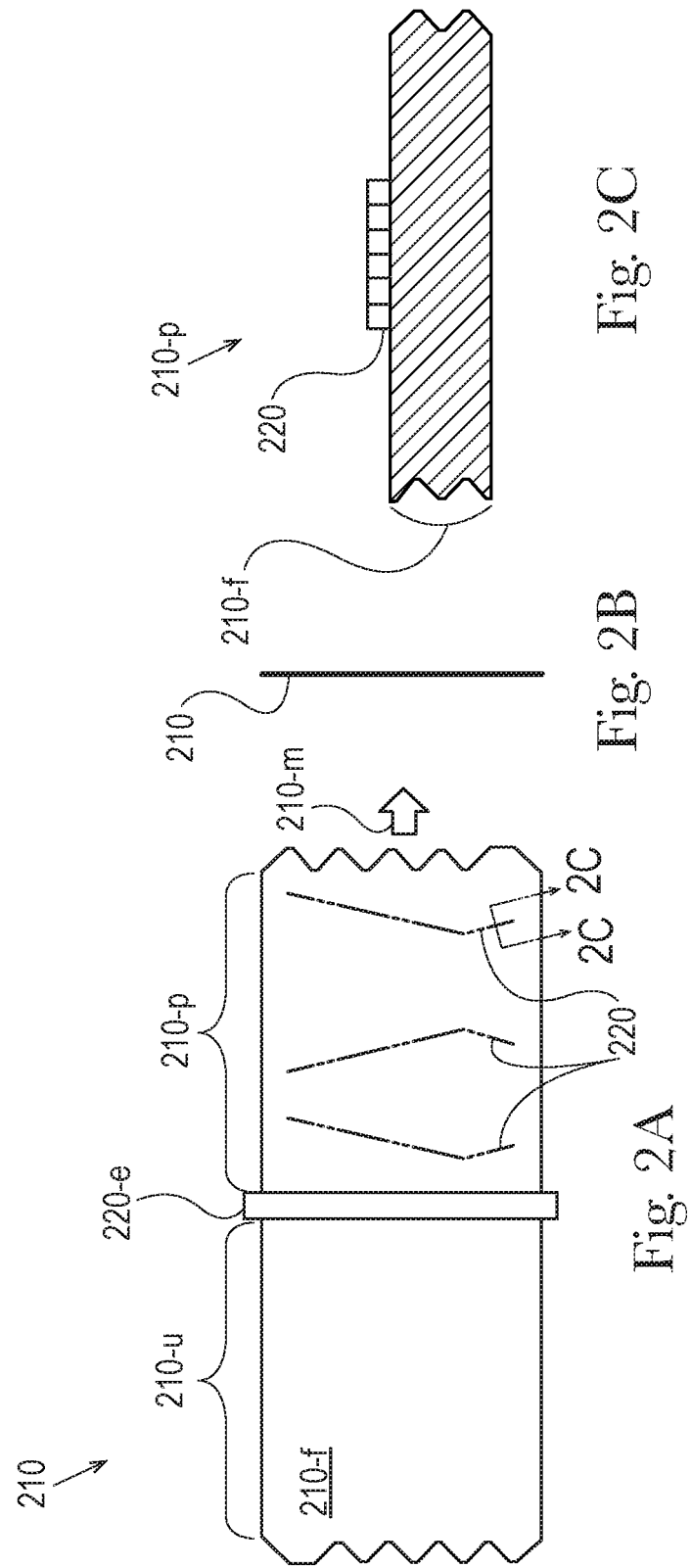

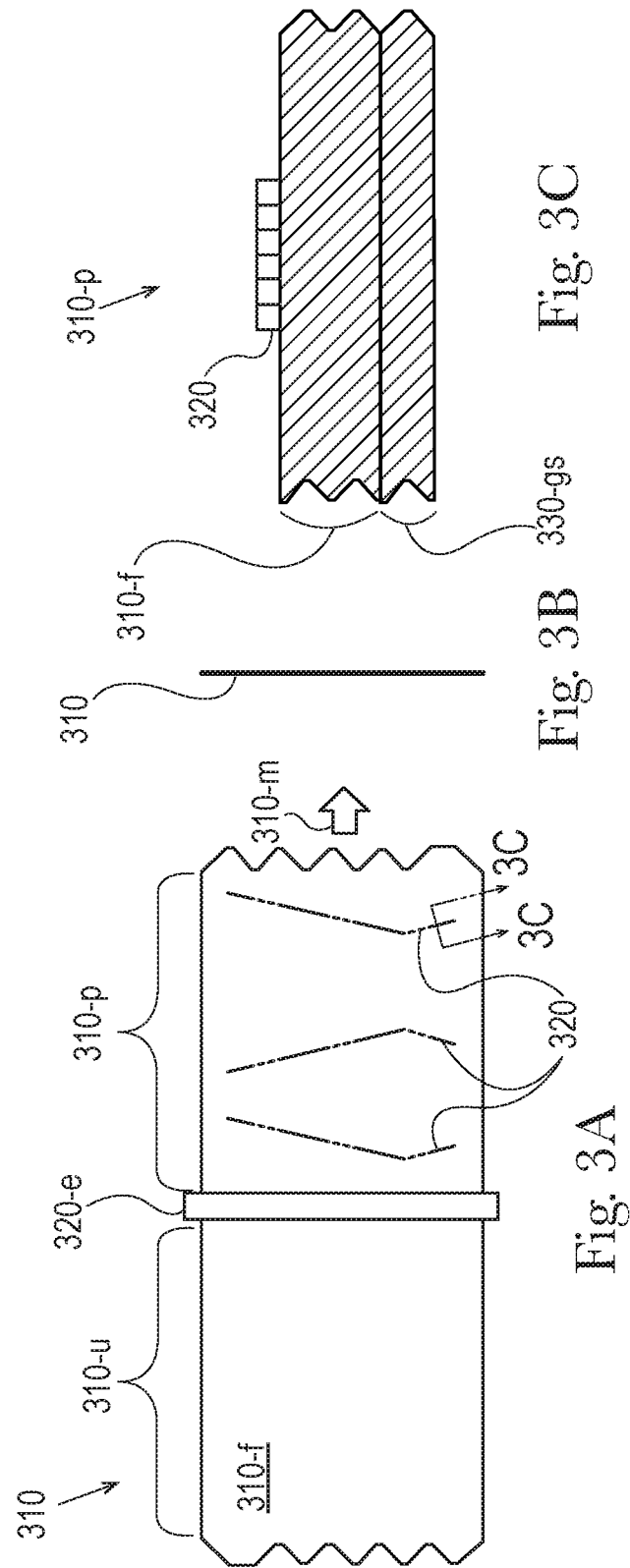

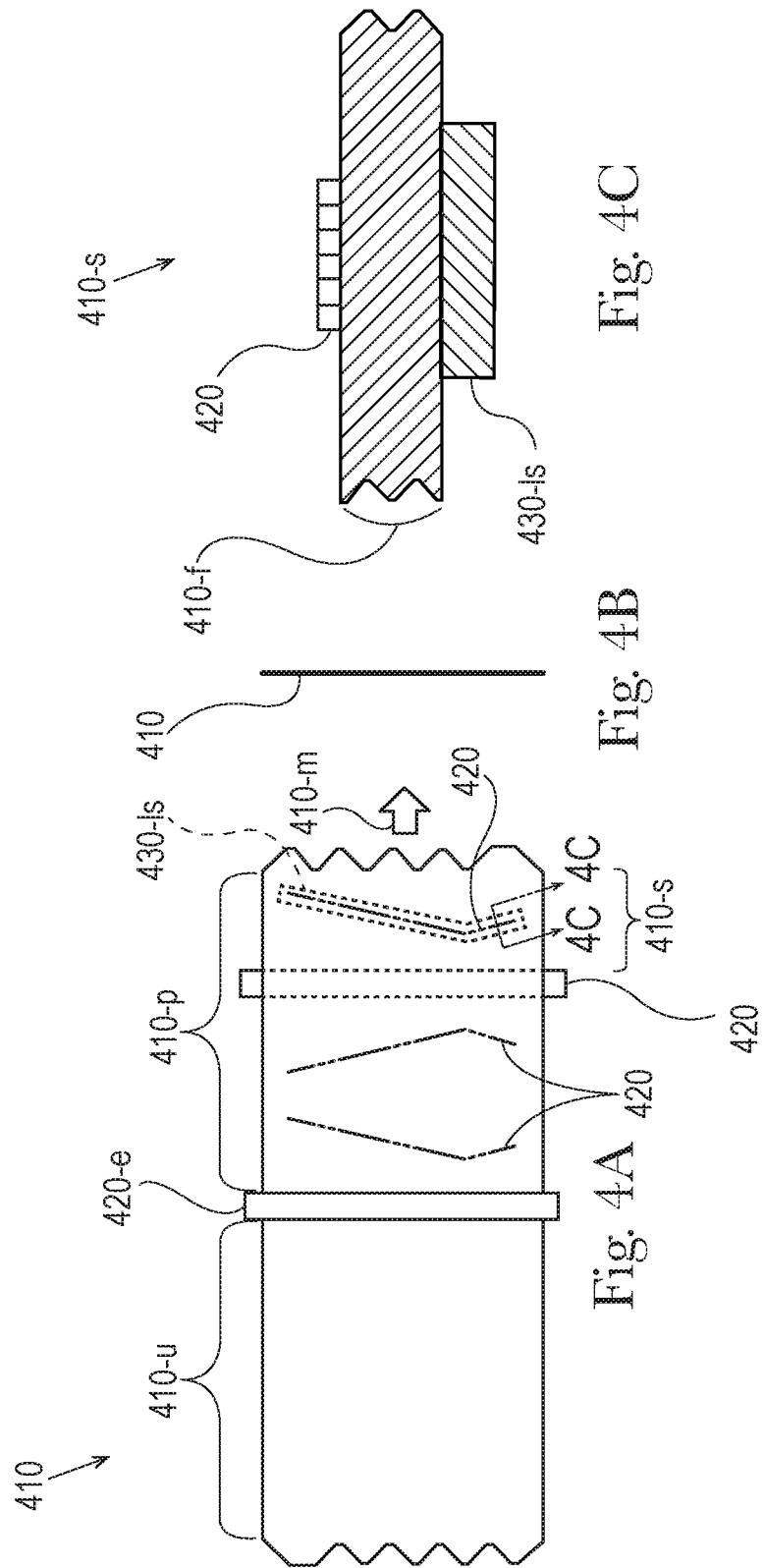

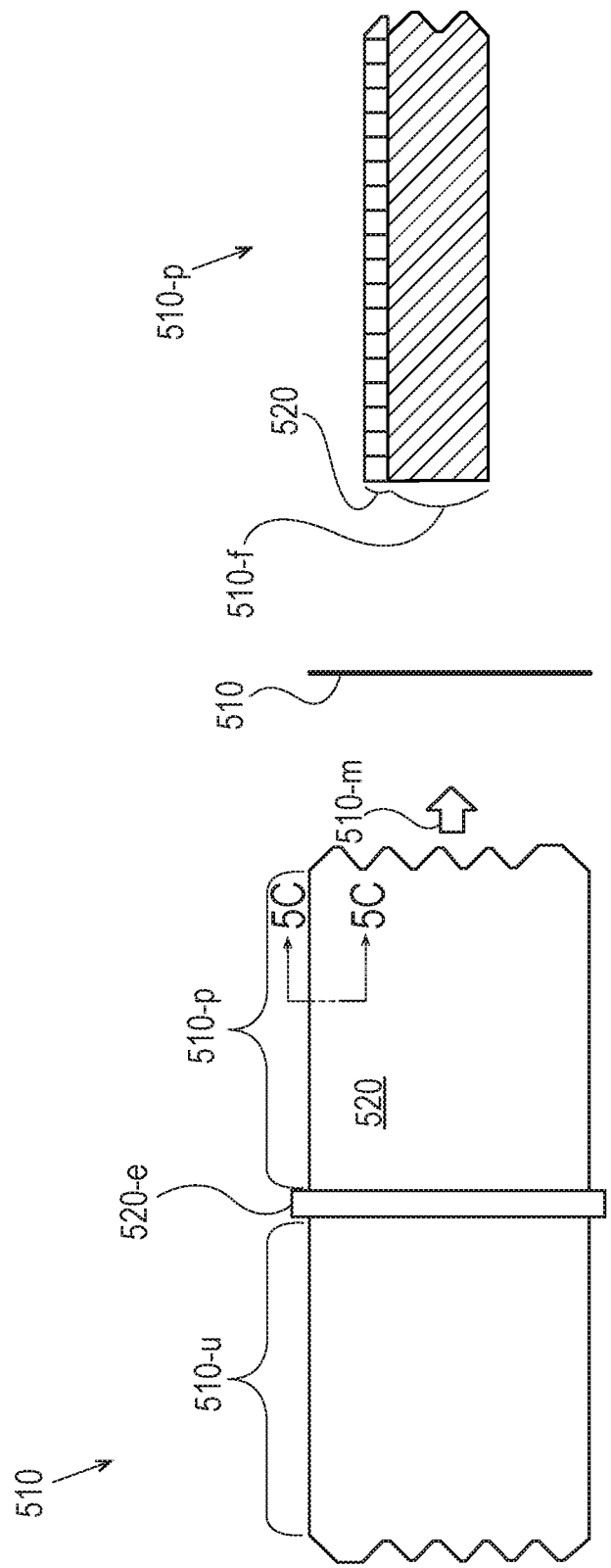

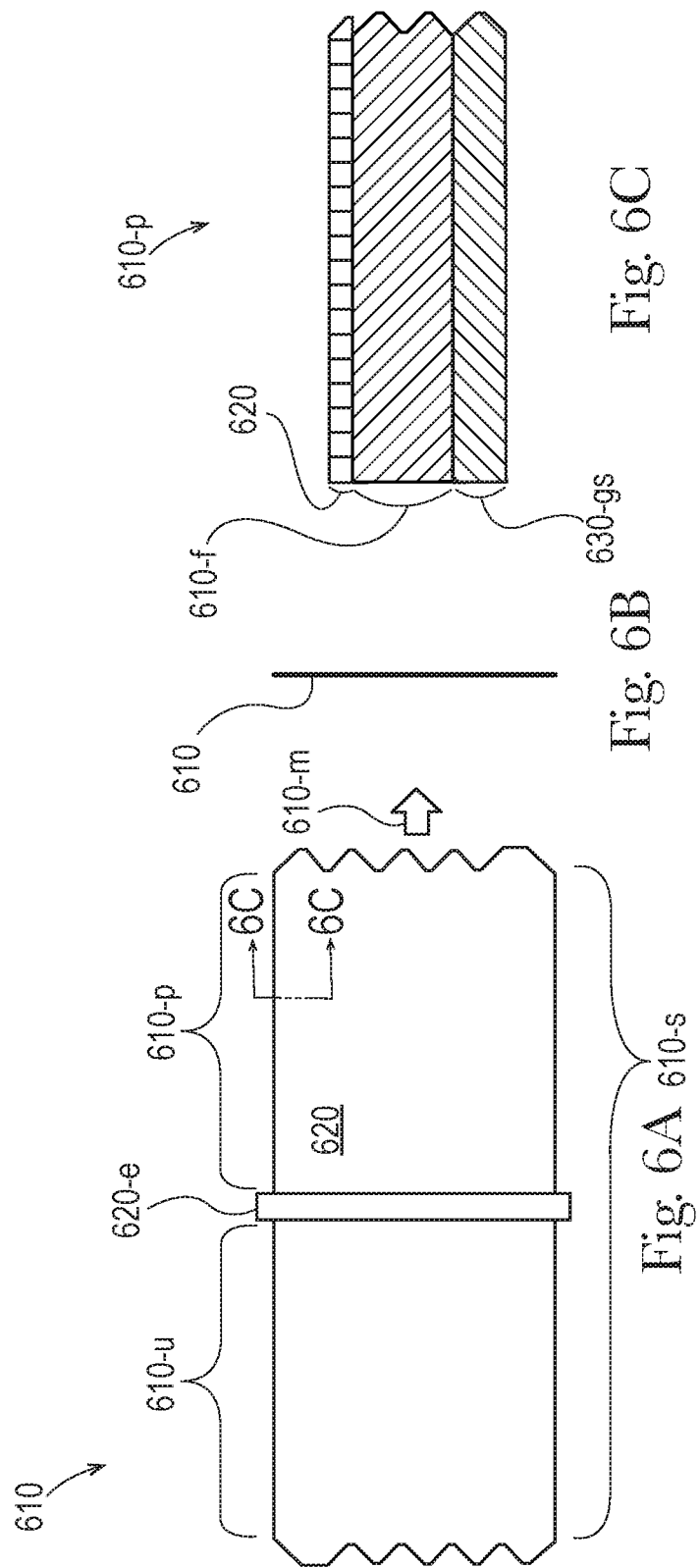

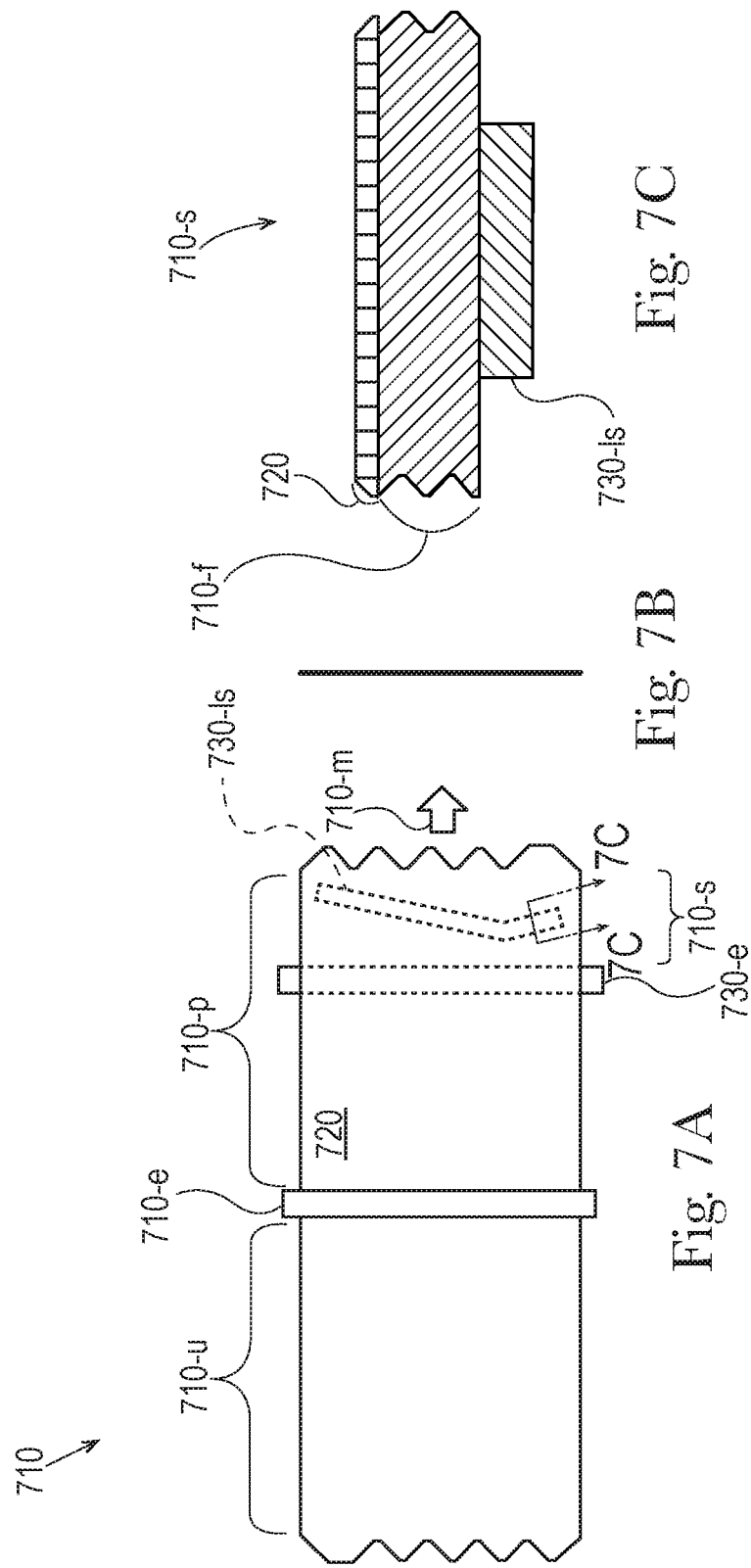

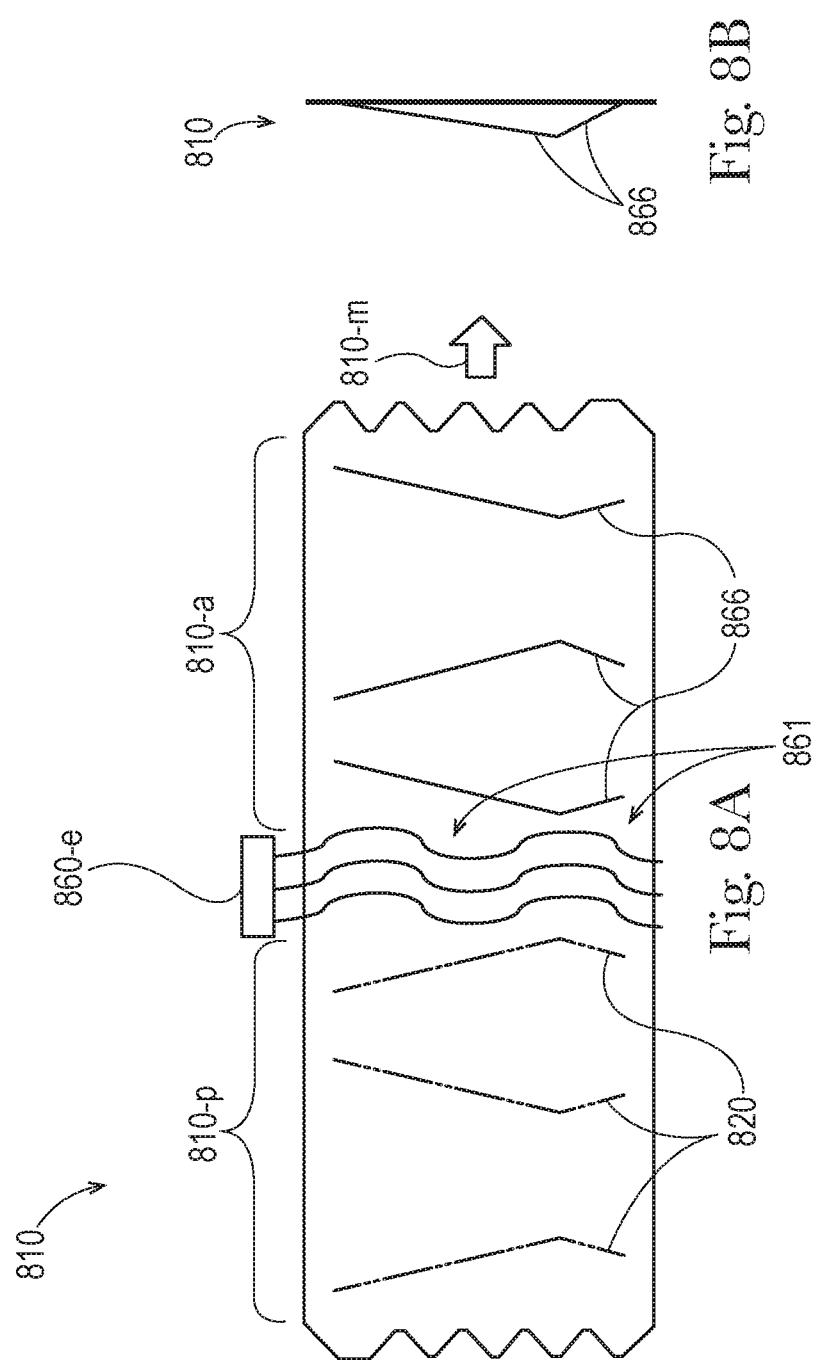

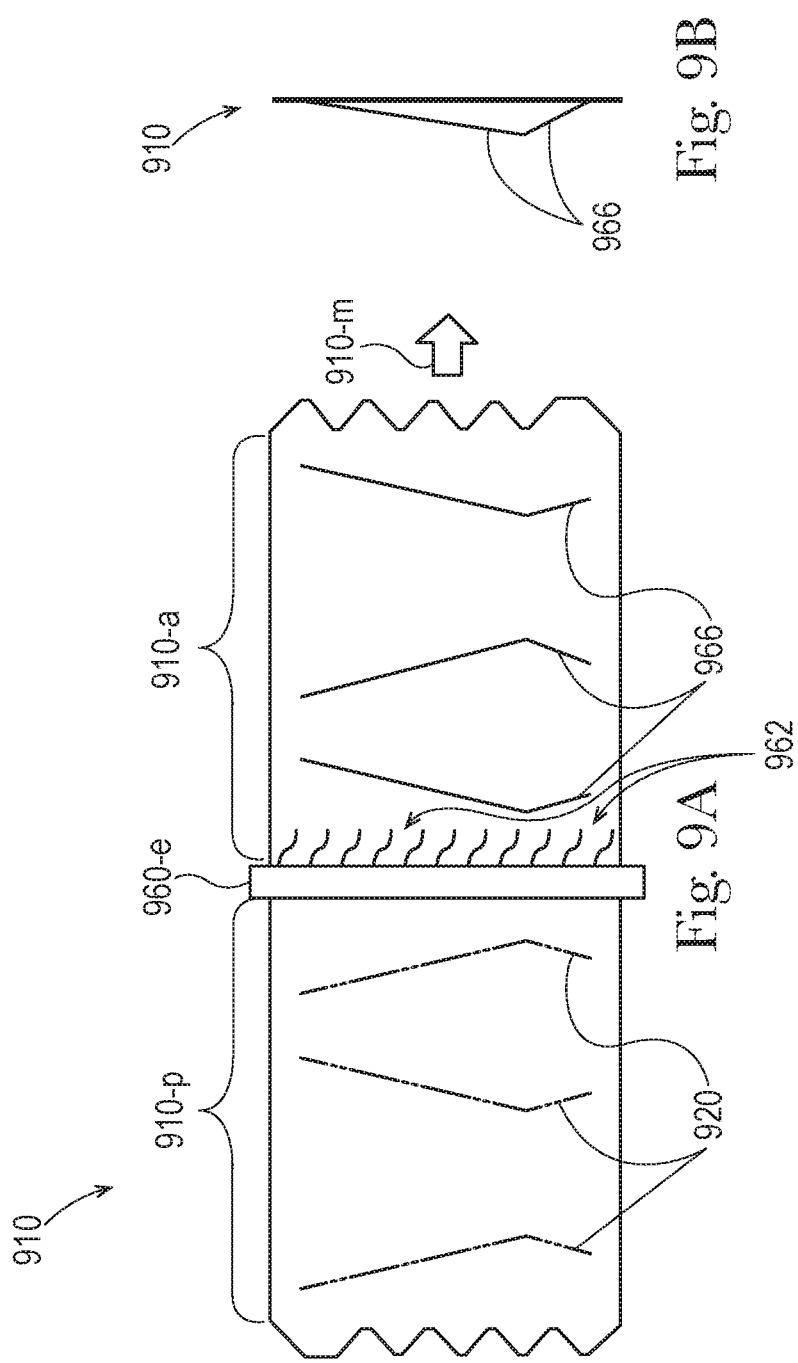

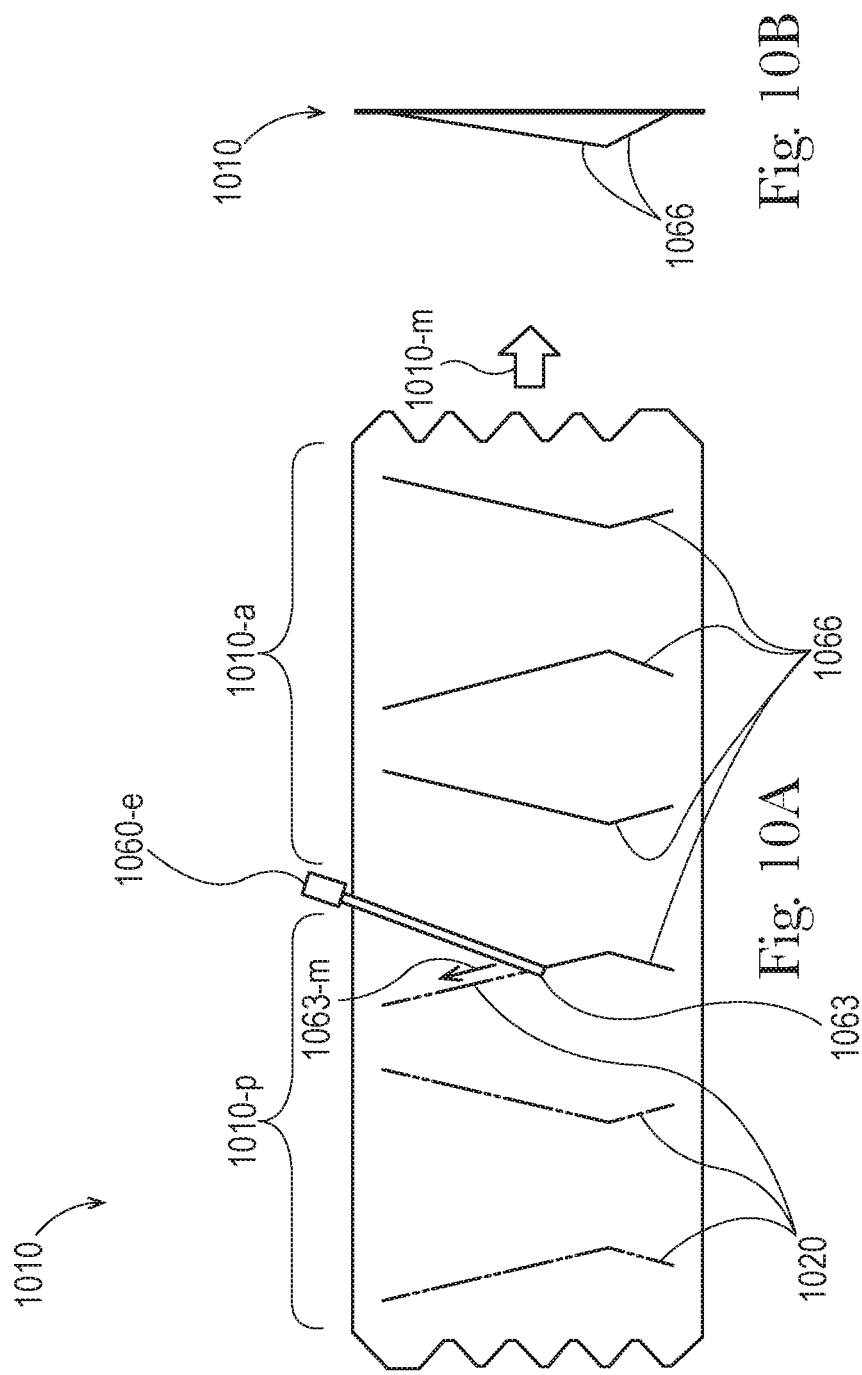

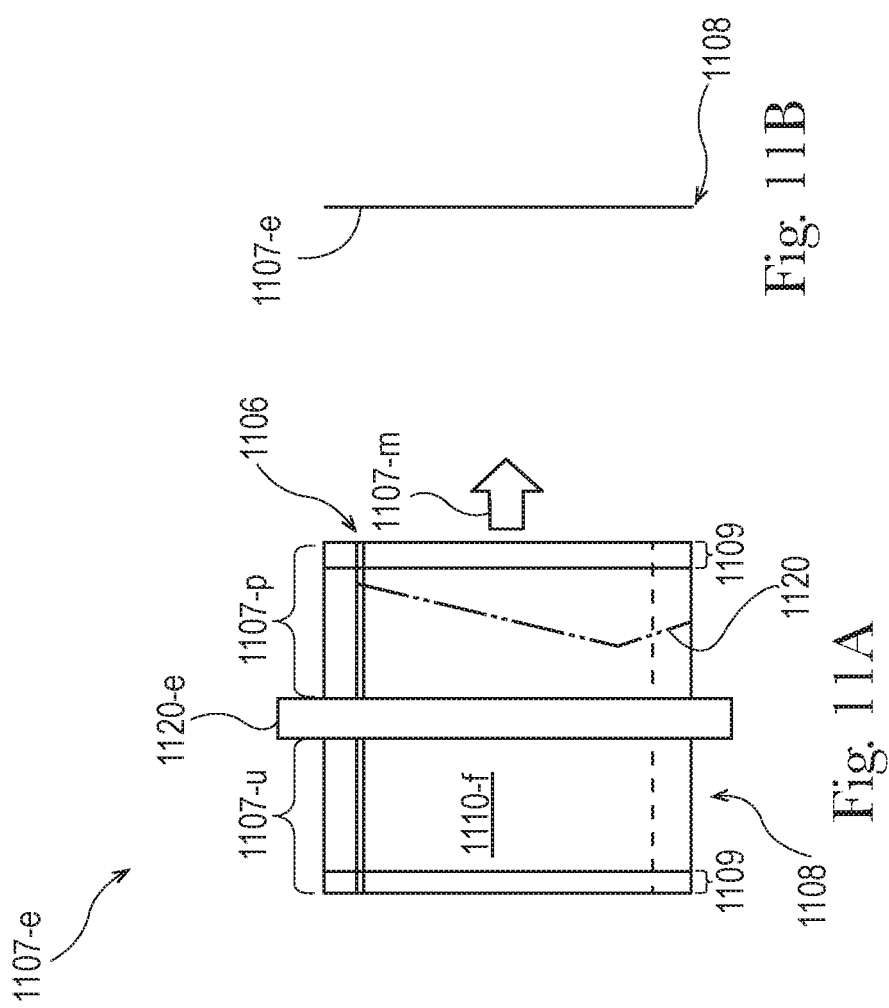

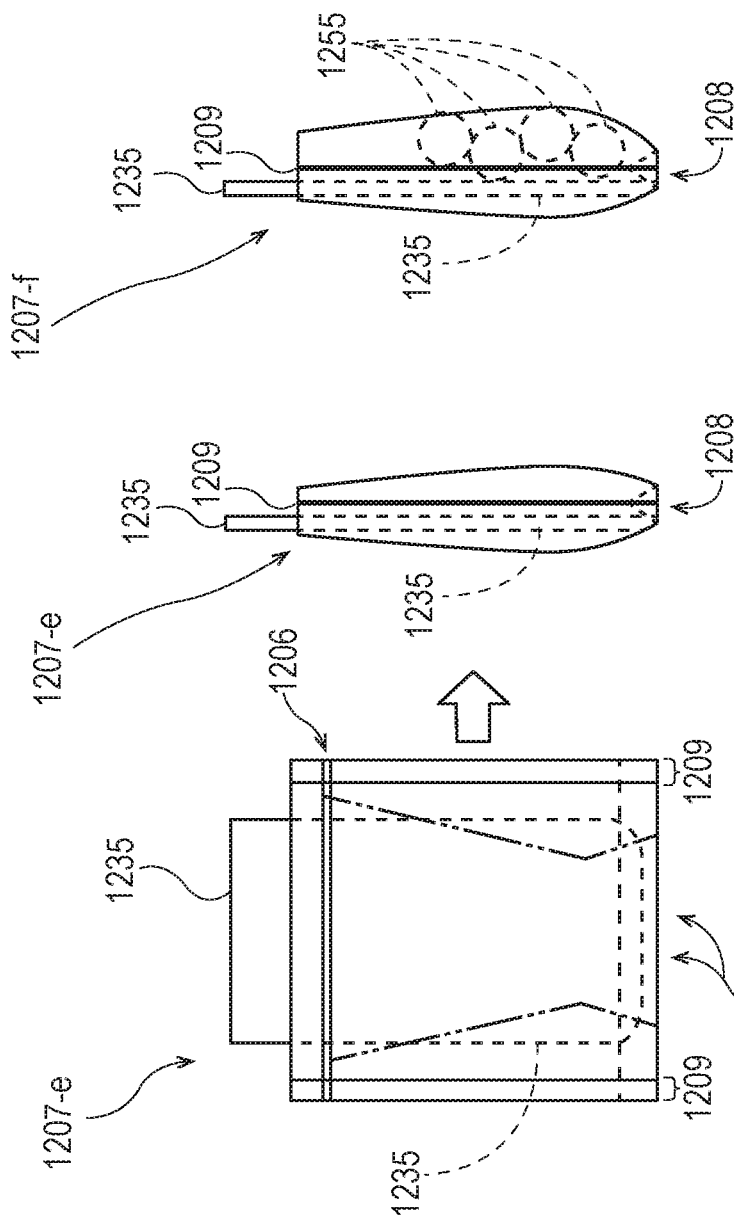

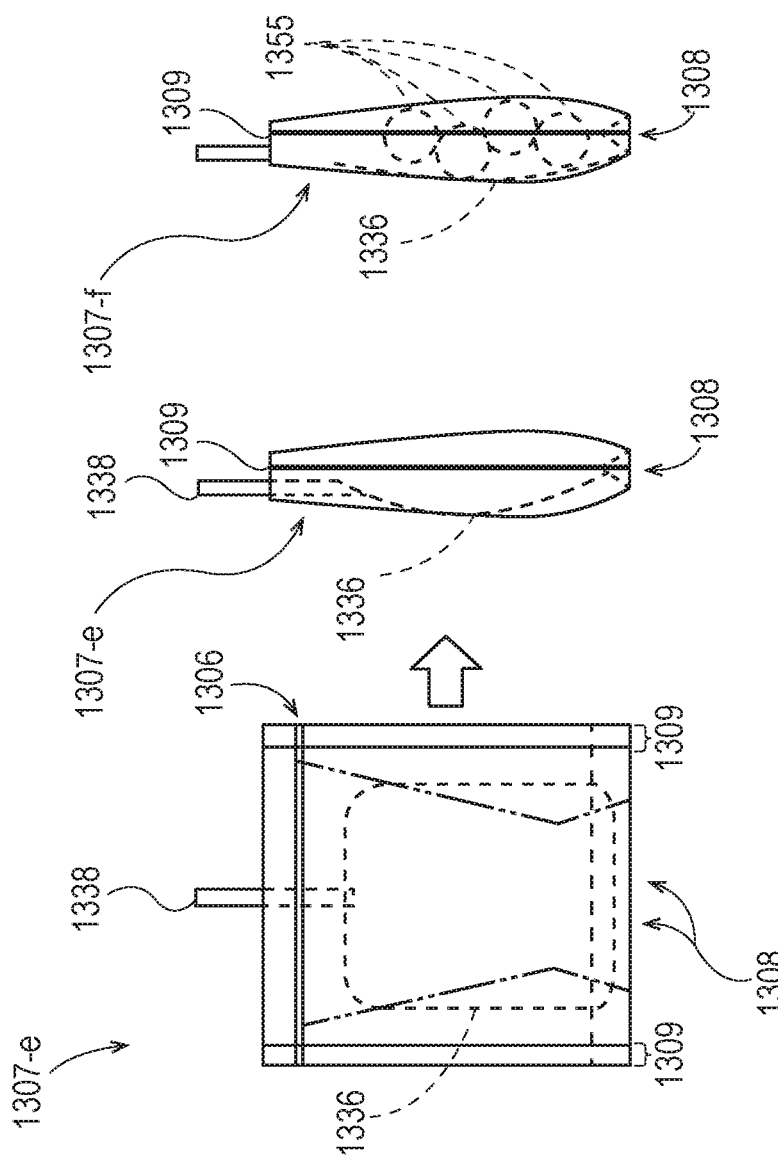

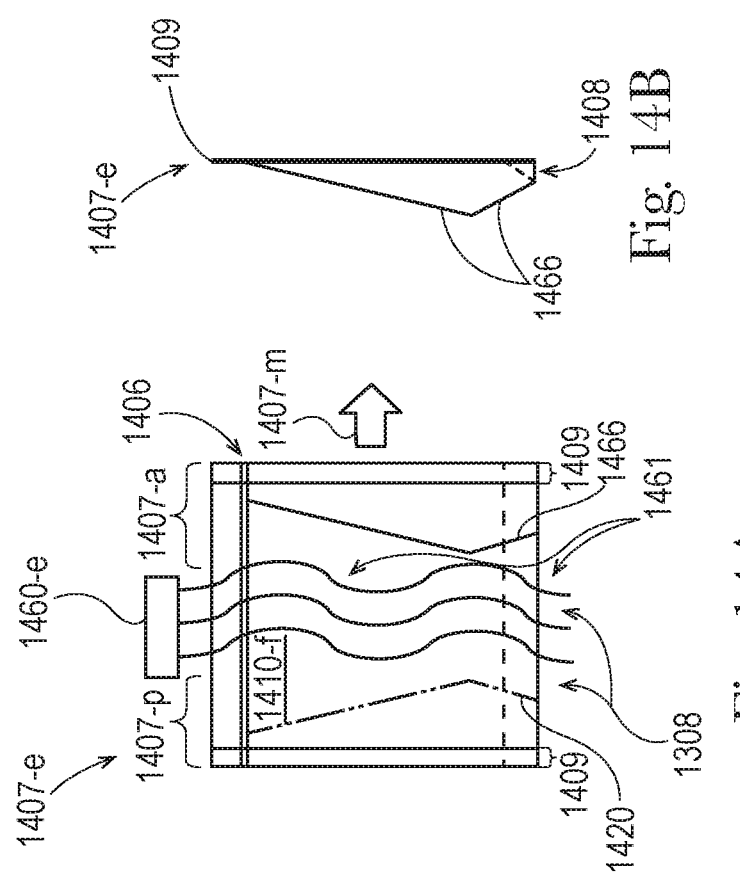

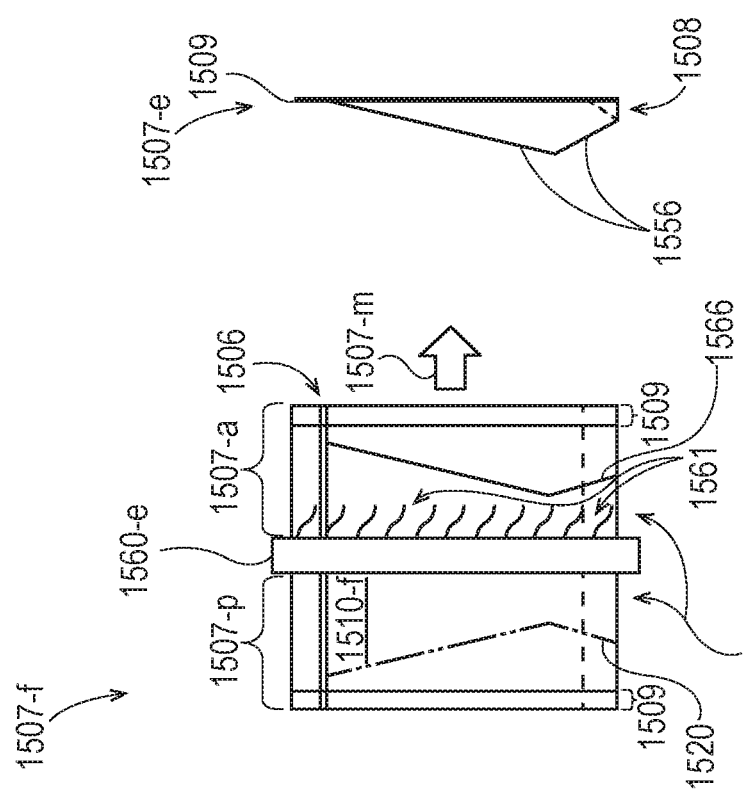

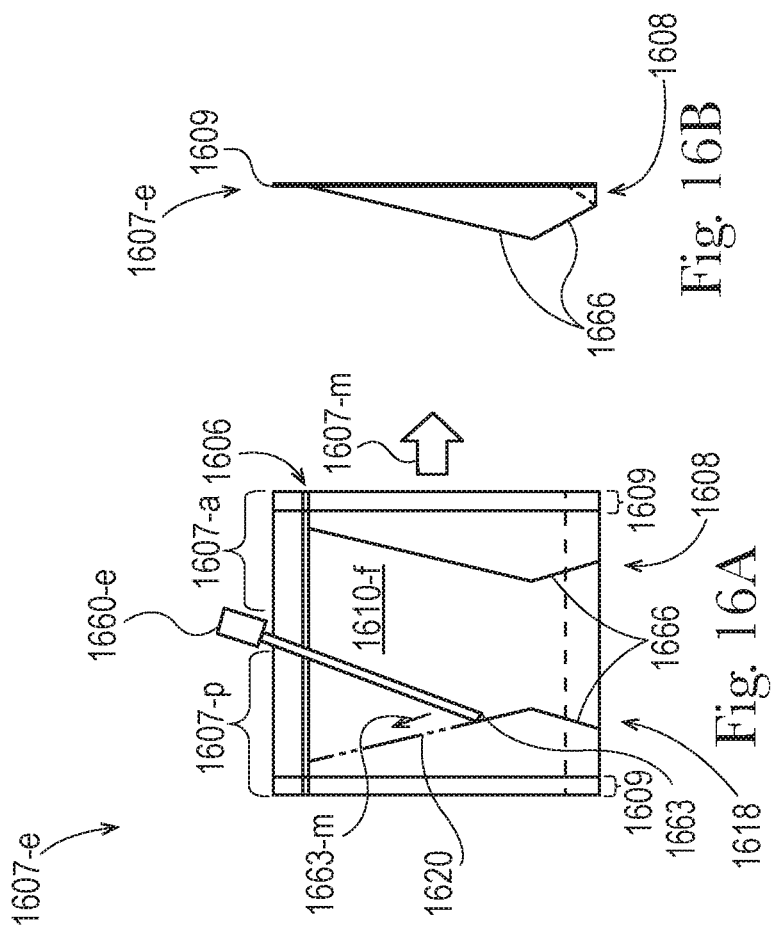

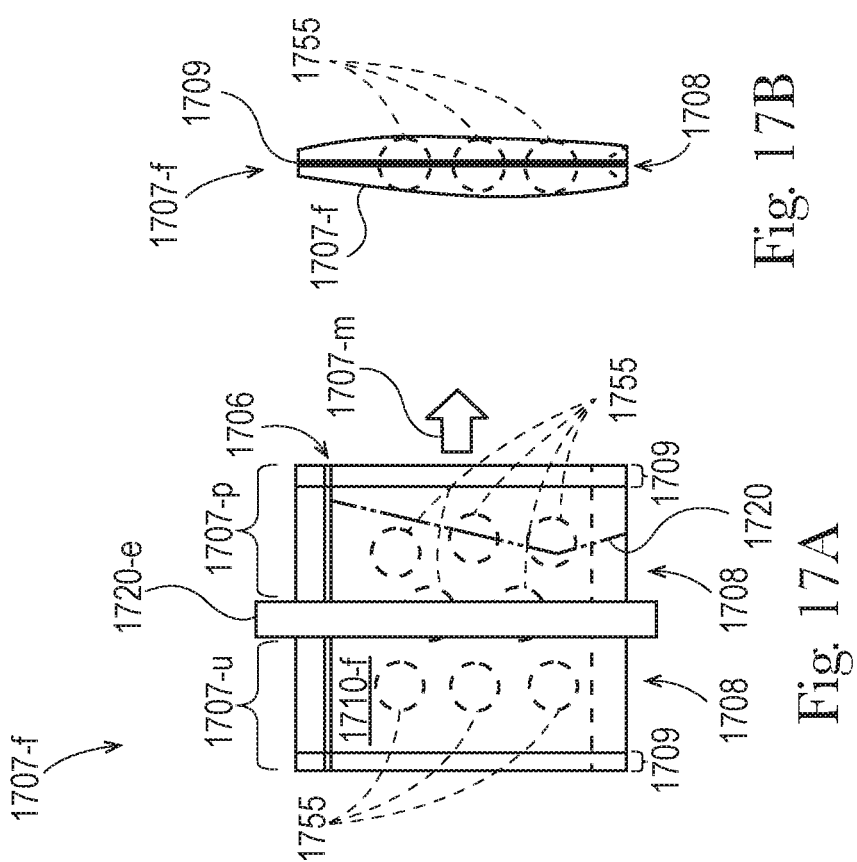

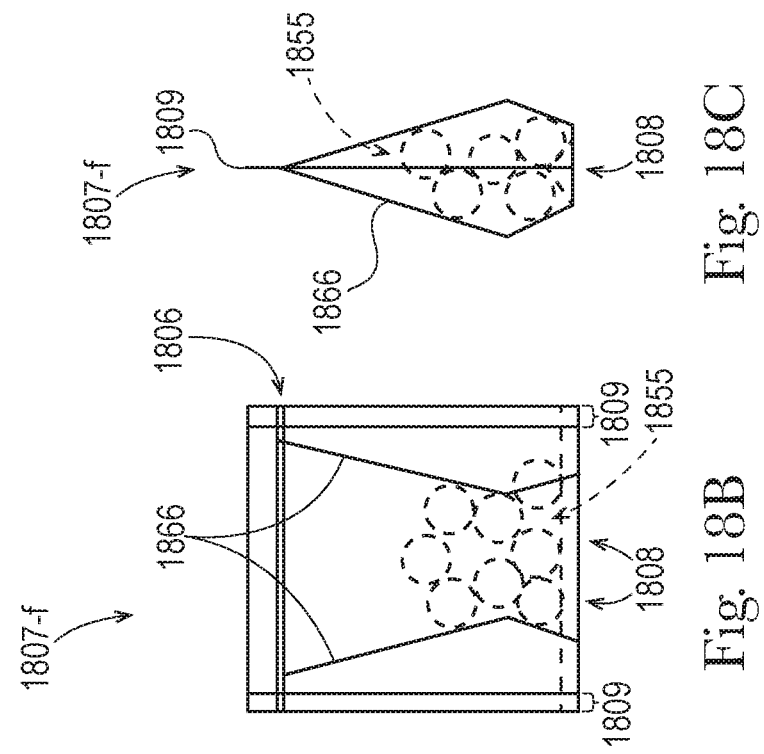
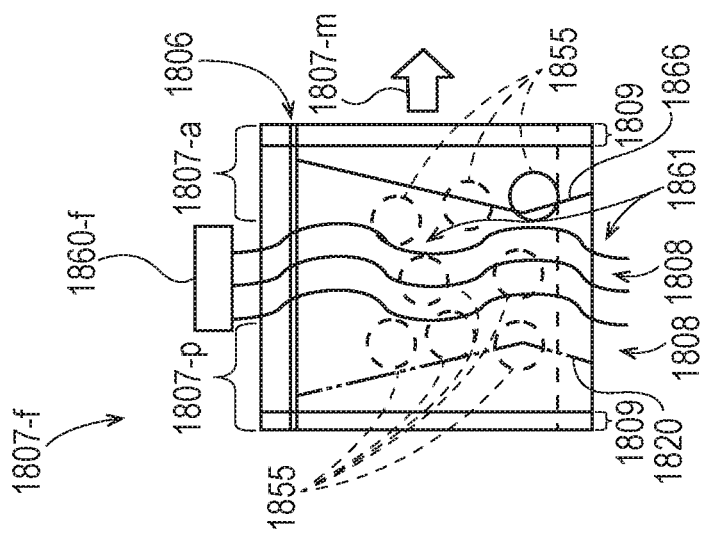
Fig. 18A  Fig. 18B  Fig. 18C

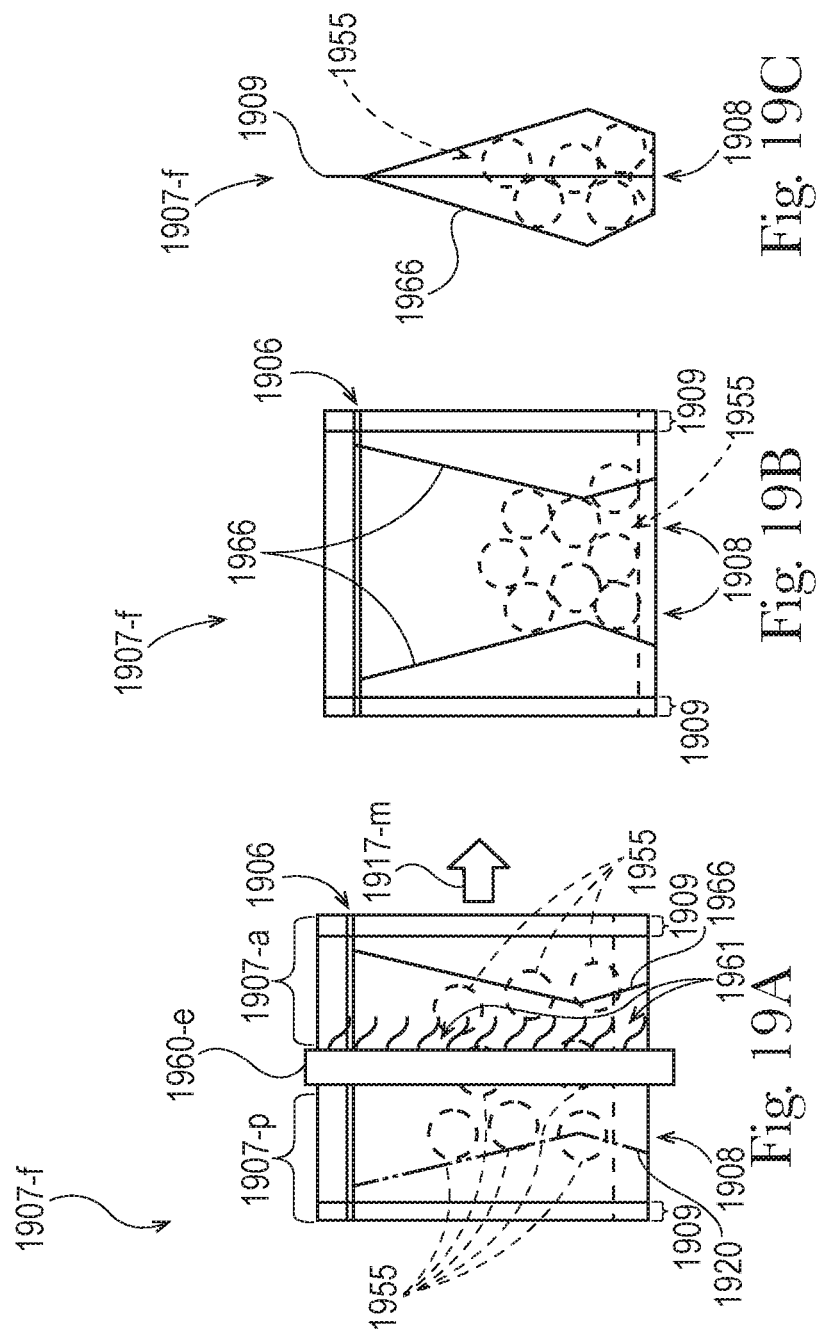

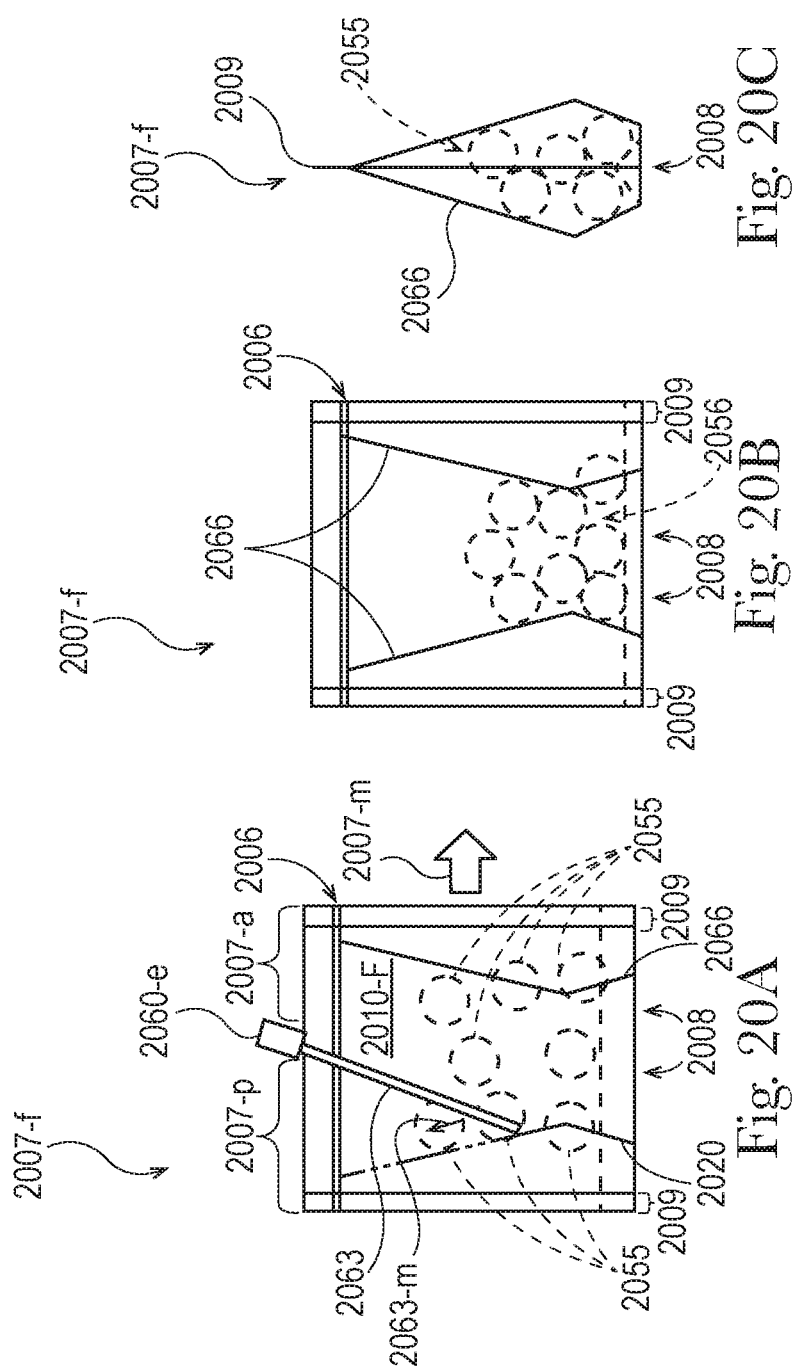

FLEXIBLE PACKAGES WITH SELF-FOLDING

CROSS REFERENCE TO RELATED APPLICATION

This application is a continuation of, and claims priority under 35 U.S.C. § 120 to, U.S. patent application Ser. No. 15/988,021, filed on May 24, 2018, which claims the benefit, under U.S.C. § 119(e), of U.S. Provisional Patent Application Ser. No. 62/511,459, filed on May 26, 2017, the entire disclosures of both of which are hereby incorporated by reference herein.

FIELD

The present disclosure relates in general to methods of flexible packages, and in particular to flexible packages having one or more self-folds.

BACKGROUND

Flexible materials can be formed into flexible packages by converting processes that use various combinations of cutting, folding, sealing, filling, and closing. These operations have conventionally been performed by mechanical machine elements, which directly contact the flexible materials. While such mechanical operations can be consistently reliable, they are limited in speed and flexibility, and their machine elements are prone to wear. These issues become more prominent on faster converting lines and for complex package designs. To mitigate these issues, the speeds of packaging lines are often limited and many flexible packages have simple designs that are less functional, aesthetically unappealing, and not desired by consumers.

SUMMARY

However, non-contact converting processes can transform flexible materials into flexible packages with greater speed and flexibility, as well as fewer machine elements that are prone to wear. A particular non-contact converting process is energy activated self-folding. Energy activated self-folding can be fast and customizable, and can transform flexible materials by using energy sources applied to flexible materials without contact (e.g. by convection and/or radiation). Energy activated self-folding can also enable more complex package designs that provide greater functionality and appealing aesthetics, which are desired by consumers.

In various embodiments, a converting process may transform flexible materials into flexible packages by using a one or more conventional converting processes (which directly contact the flexible material) along with one or more non-contact converting processes. In such embodiments, contact processes (such as mechanical folding, mechanical sealing, and mechanical gripping) may be used where it is necessary to constrain or hold together layers of the flexible material, while non-contract processes (such as self-folding) may be used to form self-folds or other shapes in parts of the flexible material that are substantially unconstrained. Such combinations of contact and non-contact processes may enable optimized converting processes.

BRIEF DESCRIPTION OF THE DRAWINGS

FIG. 2A is a side view of energy absorbing material being locally applied to a flexible material.

FIG. 2B is an end view of the material of FIG. 2A.

FIG. 2C is an enlarged, partial, cross-sectional view of FIG. 2A.

FIG. 3A is a side view of energy absorbing material being locally applied to a flexible material that includes a layer of shielding material.

FIG. 3B is an end view of the material of FIG. 3A.

FIG. 3C is an enlarged, partial, cross-sectional view of FIG. 3A.

FIG. 4A is a side view of energy absorbing material being locally applied to a flexible material as well as shielding material being locally applied to the flexible material.

FIG. 4B is an end view of the material of FIG. 4A.

FIG. 4C is an enlarged, partial, cross-sectional view of FIG. 4A.

FIG. 5A is a side view of energy absorbing material being globally applied to a flexible material.

FIG. 5B is an end view of the material of FIG. 5A.

FIG. 5C is an enlarged, partial, cross-sectional view of FIG. 5A.

FIG. 6A is a side view of energy absorbing material being globally applied to a flexible material that includes a layer of shielding material.

FIG. 6B is an end view of the material of FIG. 6A.

FIG. 6C is an enlarged, partial, cross-sectional view of FIG. 6A.

FIG. 7A is a side view of energy absorbing material being globally applied to a flexible material as well as shielding material being locally applied to the flexible material.

FIG. 7B is an end view of the material of FIG. 7A.

FIG. 7C is an enlarged, partial, cross-sectional view of FIG. 7A.

FIG. 8A is a side view of a field of activation energy being applied to a flexible material that includes energy absorbing material, wherein the activation energy causes self-folding.

FIG. 8B is an end view of the material of FIG. 8A.

FIG. 9A is a side view of activation energy being applied to a flexible material by a plurality of emitters, wherein the activation energy causes self-folding.

FIG. 9B is an end view of the material of FIG. 9A.

FIG. 10A is a side view of activation energy being applied to a flexible material in the form of a directed beam, wherein the activation energy causes self-folding.

FIG. 10B is an end view of the material of FIG. 10A.

FIG. 11A is a front view of an energy absorbing material being locally applied to an empty flexible package.

FIG. 11B is a side view of the flexible package of FIG. 11A.

FIG. 12A is a front view of a flexible package with energy absorbing material locally disposed on the package, and a temporary shield inserted into the package.

FIG. 12B is a side view of the flexible package of FIG. 12A.

FIG. 12C is a side view of the flexible package of FIG. 12A, wherein the package is filled with product.

FIG. 13A is a front view of a flexible package with energy absorbing material locally disposed on the package, and a shield material being added into the package.

FIG. 13B is a side view of the flexible package of FIG. 13A.

FIG. 13C is a side view of the flexible package of FIG. 13A, wherein the package is filled with product.

FIG. 14A is a front view of a field of activation energy being applied to an empty flexible package with energy absorbing material locally disposed on the package, wherein the activation energy causes self-folding.

FIG. 14B is a side view of the flexible package of FIG. 14A.

FIG. 15A is a front view of a plurality of emitters applying activation energy to an empty flexible package with energy absorbing material locally disposed on the package.

FIG. 15B is a side view of the flexible package of FIG. 15A.

FIG. 16A is a front view of a directed beam applying activation energy to an empty flexible package with energy absorbing material locally disposed on the package, wherein the activation energy causes self-folding.

FIG. 16B is a side view of the flexible package of FIG. 16A.

FIG. 17A is a front view of an energy absorbing material being locally applied to a flexible package filled with product.

FIG. 17B is a side view of the flexible package of FIG. 17A.

FIG. 18A is a front view of a field of activation energy being applied to a filled flexible package with energy absorbing material locally disposed on the package, wherein the activation energy causes self-folding.

FIG. 18B is a front view of the self-folded flexible package of FIG. 18A.

FIG. 18C is a side view of FIG. 18B.

FIG. 19A is a front view of a plurality of emitters applying activation energy to a filled flexible package with energy absorbing material locally disposed on the package.

FIG. 19B is a front view of the self-folded flexible package of FIG. 19A.

FIG. 19C is a side view of the flexible package of FIG. 19B.

FIG. 20A is a front view of a directed beam applying activation energy to a filled flexible package with energy absorbing material locally disposed on the package, wherein the activation energy causes self-folding.

FIG. 20B is a front view of the self-folded flexible package of FIG. 20A.

FIG. 20C is a side view of the flexible package of FIG. 20B.

DETAILED DESCRIPTION

Figure 1:
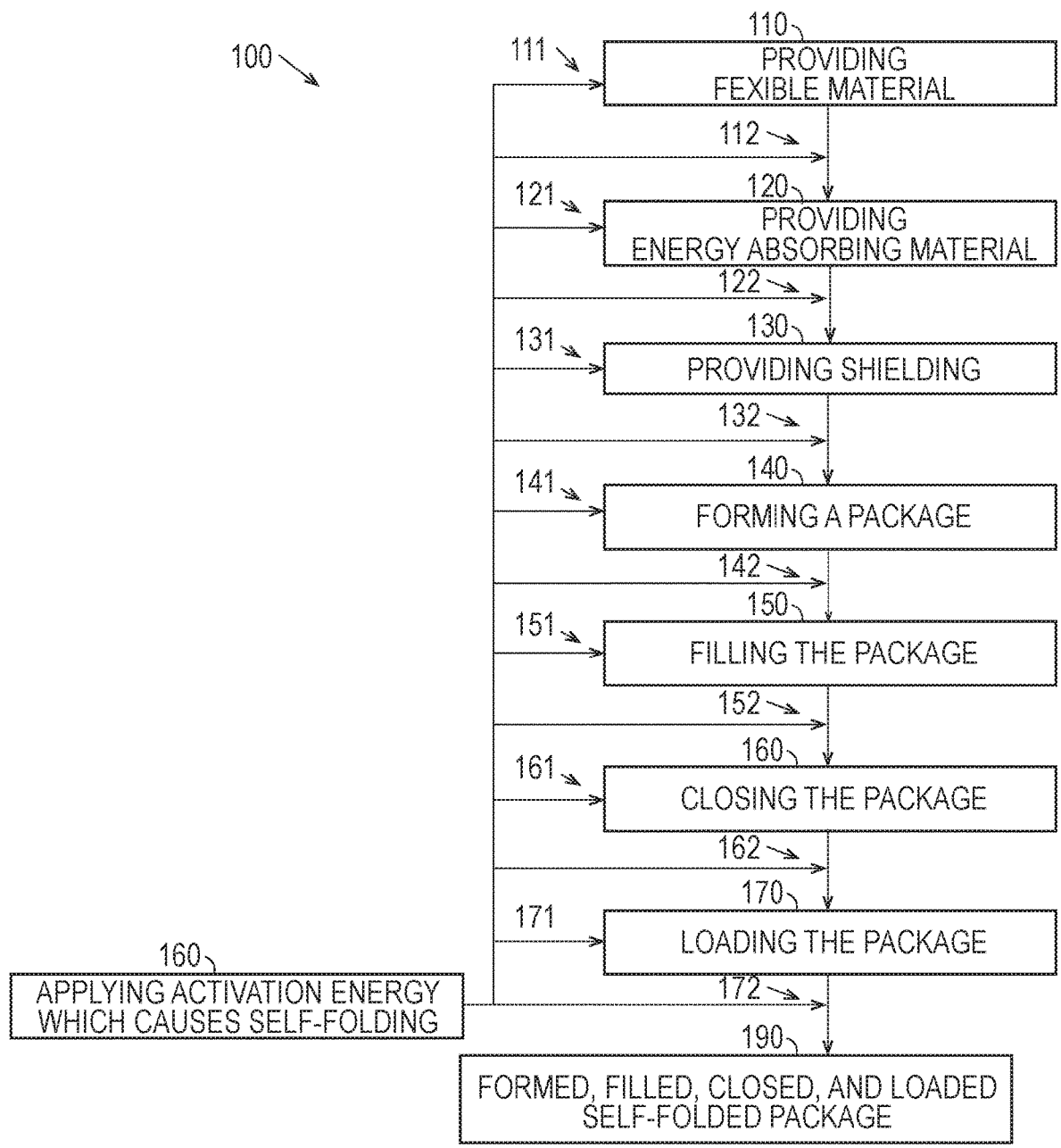
FIG. 1 is a schematic diagram of a process for making a flexible package with self-folding.

Packages made from flexible material can include one or more self-folds formed by applying activation energy to the flexible material. A flexible material configured for self-folding can have various forms, such as a film or laminate made from one or more layers of polymer (and optionally, energy absorbing materials provided in or on the flexible material). Self-folding describes the behavior of a flexible material, which responds to the application of activation energy by causing a fold to form in a defined region of the flexible material without direct contact by a shaping surface (such as a machine element); in particular self-folding behavior is fast (i.e. completely folding in seconds) and forms a distinct fold, which has a relatively small radius (i.e. on the order of millimeters); accordingly, self-folding is distinct from material behavior caused by other stimuli (e.g. mechanical), from slow material behaviors (e.g. changing shape in a minute or longer), and from material behavior that forms other shapes (e.g. large radius bending and curling).

Self-folding behavior is driven by both the structure of the flexible material and the activation energy that is applied to that structure; particular combinations of structure and energy create differential thermal responses within the flexible material, which cause the self-folding. Differential thermal responses include differing rates of thermal expansion, or differing rates of thermal contraction, or a combination of thermal expansion and thermal contraction within the flexible material, which causes a substantially flat and at least partially unconstrained flexible material to self-fold (e.g. like a hinge) when activation energy is applied and to then retain a folded shape when the activation energy is removed, under ambient conditions (i.e. 20 degrees Celsius, +/−2 degrees). A self-fold resulting from differential thermal responses can be identified by differential thermal-mechanical set in the portion of the flexible material along the fold, wherein when the activation energy is applied the flexible material heats up above its glass transition temperature (possibly to the melt transition temperature), causing expansion and/or contraction in the softened/molten flexible material resulting in self-folding, and when the activation energy is removed the flexible material cools down to ambient temperature, with the self-folded portion of the flexible material retaining a folded shape and having increased thickness and/or reduced prestrain (e.g. polymers arranged with less potential to contract) along the self-fold. Thus, the differential thermal-mechanical set in the portion of the flexible material along the self-fold can be ascertained by an increased thickness and/or reduced prestrain when compared with portions of the flexible material outside of the self-fold.

The differential thermal-mechanical set in a portion of a flexible material along a self-fold can result in the flexible material having an overall thickness in the portion that is 5-30% thicker than the overall thickness of the flexible material in portions outside of the self-fold; in various embodiments, the differential thermal set can have an overall thickness that is increased by 5-30%, or by any integer value for percentage between 5 and 30%, or by any range formed by any of these values, such as 5-25%, 5-20%, 5-15%, 5-10%, 10-30%, 15-30%, 20-30%, 25-30%, 10-25%, 15-20%, etc.

The differential thermal-mechanical set in a portion of a flexible material along a self-fold can result in the flexible material having a degree of prestrain in the portion that is reduced when compared with the degree of prestrain in the portions outside of the self-fold; in various embodiments, the differential thermal set can have a prestrain that is reduced by 30-100%, or by any integer value for percentage between 30 and 100%, or by any range formed by any of these values, such as 40-100%, 50-100%, 60-100%, 70-100%, 80-100%, 90-100%, 30-90%, 30-80%, 30-70%, 30-60%, 30-50%, 30-40%, 40-90%, 50-80%, 60-70%, etc.

In various embodiments, self-folding can be driven by a local difference in structure (e.g. chemistry or microstructure) activated by globally applied energy, a global difference in structure activated by locally applied energy, by a local difference in structure activated by locally applied energy, or by any combination of these.

The structure of a flexible material can have varying degrees of response to activation energy; a structure that tends to absorb an activation energy is termed susceptible to that energy, while a structure that does not tend to an absorb activation energy is termed transparent to that energy. A flexible material can include one or more parts, layers, or materials that are more susceptible to activation energy (i.e. having a relatively greater degree of energy absorption) as well as one or more parts, layers, or materials that are more transparent to activation energy (i.e. having a relatively lesser degree of energy absorption).

Susceptibility and transparency are material properties that can be selected and/or modified, to configure a flexible material for self-folding. A flexible material structure can be substantially transparent to activation energy by its chemical properties, in that the material may inherently absorb little energy applied at particular frequencies and/or wavelengths. Conversely, a flexible material structure can be substantially susceptible to activation energy by its chemical properties, in that the material may inherently absorb significant amounts of energy applied at particular frequencies and/or wavelengths.

As an example, polyethylene (PE) is substantially transparent to certain frequencies of laser energy while polyethylene terephthalate (PET) is quite susceptible to those frequencies; so, for a laminate made from a layer of polyethylene joined to a layer of polyethylene terephthalate, when activation energy (e.g. in the form of a laser) is applied to the laminate at those frequencies, much of that energy is absorbed by the polyethylene terephthalate while little of that energy is absorbed by the polyethylene; as the layers absorb differing amounts of energy, the layers also produce different thermal responses within the flexible material, which cause self-folding in the area heated by the laser energy.

The susceptibility of a formed material can be increased by mixing energy absorbing materials (e.g. susceptors) as additives into the chemistry forming that material. Further, activation energy can be selectively applied to a portion of a flexible material by disposing energy absorbing material in proximity to that portion. And lastly, activation energy can be selectively excluded from one or more portions of a flexible material (by itself or formed into a flexible package) by blocking the energy with a shield or shielding material that is substantially impervious to the activation energy, wherein the shielding material is disposed between the source of the energy and the portion(s) being shielded. Activation energy for self-folding can be applied in various forms provided by various sources. Forms of activation energy can include light, heat, lasers, microwaves, etc. Sources for these can include one or more emitters arranged to provide a three-dimensional field, a two-dimensional field (from a linear array of emitters), a directed beam, or other forms of activation energy.

A suitable range of activation energy can be chosen from the electromagnetic spectrum based on the chemistry of the flexible material and/or any energy absorbing materials used in/on the flexible material. In various embodiments disclosed herein, laser activation energy can have wavelengths of 150 nanometers to 1 millimeter, or any wavelengths within this range, including ultraviolet (wavelengths of 150-400 nanometers), visible light (wavelengths of 400-750 nanometers), near-infrared (wavelengths of 0.75-3 micrometers), mid-infrared (3-30 micrometers), and far-infrared (30 micrometers-1 millimeter). In various embodiments disclosed herein, microwave activation energy can have wavelengths of 1 millimeter to 1 meter (or any wavelength within this range).

For laser wavelengths of about 9-11 microns, polyamides (such as Nylon), polyvinyl chlorides (PVCs), and polyethylene terephthalates (PETs) (in their raw forms, without additives) inherently absorb such wavelengths and are thus considered susceptible to that activation energy, while polyethylenes (such as LDPE and LLDPE) (in their raw forms, without additives) do not inherently absorb such wavelengths, and are thus considered substantially transparent to that activation energy. Some examples of energy absorbing materials, which can be used as susceptible additives for making polymeric films/laminates and/or for disposing on flexible materials include: "natural silicates . . . , silica, calcium carbonate, barium sulphate, aluminum hydrate, and metallic hydroxysulphates . . . boron-oxygen compounds . . . boric acid, alkaline and alkaline earth borates, aluminum borate, zinc borate, and anhydrous borax" as disclosed by U.S. Pat. No. 4,559,381 (col. 1, lines 42-44; col. 3, lines 1-3) to Tapia, et al. entitled "Polymeric Covering Materials for Growing Plants or Crops." Other chemistries can also act as energy absorbing materials, such as: "fillers, colourants, release agents, UV retardants, flame retardants, etc." as disclosed on page 1622 of the Handbook of Laser Technology an Applications; Volume III Applications, by Colin Webb and Julian Jones (Institute of Physics Publishing, 2004). Films and/or laminates that are laser susceptible and/or that include energy absorbing materials can also be obtained from various film suppliers, such as Mondi Gronau GmbH, of Gronau, Germany. It is contemplated that the self-folding described herein can be accomplished using any combination of structure and activation energy known in the art, including those disclosed in "Self-folding of polymer sheets using microwaves and graphene ink" by Duncan Davis, Russell Mailen, Jan Genzer, and Michael D. Dickey, published in the Royal Society of Chemistry, 2015.

FIG. 1 is a schematic diagram of a process 100 for making a flexible package with self-folding. The process 100 includes: step 110, providing one or more flexible materials, each of which can be any flexible material described herein, including any alternative embodiments; step 120, providing energy absorbing material, which can be provided to the flexible material in any way described in connection with the embodiments of FIGS. 2A-7C (including any alternative embodiments), or can be provided to an at least partially formed, empty flexible package in any way described in connection with the embodiments of FIGS. 11A-11B, or can be provided to an at least partially formed, filled flexible package in any way described in connection with the embodiments of FIGS. 17A-17B (or, step 120 can optionally can be omitted); step 130, providing shielding, which can be providing a layer of shielding material globally disposed in any way described in connection with the embodiments of FIGS. 3A-3C and 6A-6C (including any alternative embodiments), and/or which can be providing a layer of shielding material locally disposed in any way described in connection with the embodiments of FIGS. 4A-4C and 7A-7C (including any alternative embodiments), and/or which can be providing a temporary shield in any way described in connection with the embodiments of FIGS. 12A-12C (including any alternative embodiments), and/or can be providing shielding material in any way described in connection with the embodiments of FIGS. 13A-13C (including any alternative embodiments) (or, step 130 can optionally can be omitted); step 140, forming a package, which can accomplished manually or by using any package forming processes and equipment known in the art; step 150, filling the formed package with one or more products, which can be accomplished manually or by using any package filling processes and equipment known in the art, to fill a flexible package with one or more of any kind of product (such as consumer products); step 160, closing the filled package, which can be accomplished manually or by using any package closing processes and equipment known in the art, to close a flexible package filled with one or more of any kind of product; step 170, loading the closed package (into a parent container, such as a cardboard case or a shipping container), which can be accomplished manually or by using any package loading processes and equipment known in the art, to load a flexible package; and step 190, providing a formed, filled, closed, and loaded and flexible package (i.e. a packaged product), wherein the flexible material of the flexible package includes one or more self-folds, according to any embodiment disclosed herein. The process 100 also includes step 180, applying activation energy, which causes self-folding, which can be accomplished in various ways and at various points in the process 100, including: applying activation energy to a flexible material, in any way described in connection with the embodiments of FIGS. 8A-10B (including any alternative embodiments); and/or applying activation energy to an empty flexible package, in any way described in connection the embodiments of FIGS. 14A-16B (including any alternative embodiments); and/or applying activation energy to a filled flexible package, in any way described in connection with the embodiments of FIGS. 18A-20C; wherein the activation energy can, in various embodiments, be applied: at time 111, during step 110; at time 112, which is after step 110 but before step 120; at time 121, during step 120; at time 122, which is after step 120 but before step 130; at time 131, during step 130; at time 132, which is after step 130 but before step 140; at time 141, during step 140; at time 142, which is after step 140 but before step 150; at time 151, during step 150; at time 152, which is after step 150 but before step 160; at time 161, during step 160; at time 162, which is after step 160 but before step 170; at time 171, during step 150; at time 172, which is after step 170; or any combination of any of these. In various alternative embodiments: part, parts, or all of one or more of the steps within the process 100 can be performed in various orders, at separate times, at overlapping times, or at the same time, in any workable way; part, parts, or all of one or more of the steps within the process 100 can be can be performed as a continuous process, or as intermittent processes, or as a combination of continuous and intermittent processes; part, parts, or all of one or more of the steps within the process 100 can be can be performed in multiple steps; part, parts, or all of one or more of the steps within the process 100 can be omitted; part, parts, or all of one or more of the steps within the process 100 can be modified according to any processes known in the art; and additional and/or alternative steps known in the arts of making, printing on, and applying activation energy to flexible materials and packages, can be added to the process 100.

FIGS. 2A-10B describe and illustrate various embodiments of flexible materials configured to be formed into flexible packages, wherein at least portions of the flexible materials include energy absorbing material and (optionally) shielding material. In these embodiments, the flexible materials are described and illustrated as continuous webs, however this is not required and the flexible materials can take any convenient form described herein or known in the art; any of these flexible materials can be configured to be formed into flexible packages (e.g. printed with one or more graphics) in any way described herein or known in the art. In these embodiments, the energy absorbing material has a greater degree of energy absorption (for a particular activation energy) when compared to the flexible material and the energy absorbing material is configured to at least contribute to self-folding when the activation energy is subsequently applied, and can take any form described herein or known in the art; while the energy absorbing material is described and illustrated as disposed on particular portions of the flexible materials, these particular portions are exemplary and non-limiting; energy absorbing material can be disposed in any particular line(s), pattern(s), and/or other arrangement, of any size, shape, and number to cause the desired inward or outward self-folding behavior on either or both sides of a flexible material. Also, in these embodiments, while energy absorbing materials are described as being printed onto flexible materials, such materials can be locally and/or globally disposed on flexible materials using any deposition method known in the art. Further, in these embodiments, the shielding material is configured to at least assist in preventing such activation energy from passing through, and can take any form described herein or known in the art. For any of the flexible materials of FIGS. 2A-10B, activation energy can be subsequently applied in any way described herein or known in the art.

FIG. 2A is a side view of a continuous web of flexible material 210 configured to be formed into flexible packages, wherein the flexible material 210 comprises a film 210-f and includes an unprinted portion 210-u as well as a printed portion 210-p (and since the flexible material 210 does not include a layer of shielding material, the flexible material 210 is considered to be unshielded), wherein the flexible material 210 moves 210-m (using web handling equipment, not shown) proximate to a printer 220-e, which prints energy absorbing material 220 (shown as phantom lines) onto portions of one (near) side of the film 210-f, such that the energy absorbing material 220 is locally disposed on the one side of the flexible material 210 in the printed portion 210-p, wherein the portions with the energy absorbing material 220 are configured to at least contribute to self-folding when activation energy is subsequently applied (as described herein). FIG. 2B is an end view of the flexible material 210 of FIG. 2A, which shows that the flexible material 210 is substantially flat and unfolded. FIG. 2C is an enlarged, partial, cross-sectional view of part of the printed portion 210-p of FIG. 2A. In alternative embodiments of FIGS. 2A-2C, energy absorbing material may additionally or alternatively be locally and/or globally disposed on both sides of the flexible material, and/or between layers of the flexible material, and/or within one or more layers of the flexible material (e.g. as an additive), in any workable combination.

FIG. 3A is a side view of a continuous web of flexible material 310 configured to be formed into flexible packages, wherein the flexible material 310 comprises a film 310-f and a layer 330-gs of shielding material on one (far) side and includes an unprinted portion 310-u as well as a printed portion 310-p, wherein the flexible material 310 moves 310-m (using web handling equipment, not shown) proximate to a printer 320-e, which prints energy absorbing material 320 (shown as phantom lines) onto portions of the other (near) side of the film 310-f, such that the energy absorbing material 320 is locally disposed on the other side of the flexible material 310 (opposite from the side with the layer 330-gs of shielding material) in the printed portion 310-p, wherein the portions with the energy absorbing material 320 are configured to at least contribute to self-folding when activation energy is subsequently applied (as described herein), and the layer 330-gs of shielding material is configured to at least assist in preventing such activation energy from passing through. FIG. 3B is an end view of the flexible material 310 of FIG. 3A, which shows that the flexible material 310 is substantially flat and unfolded. FIG. 3C is an enlarged, partial, cross-sectional view of part of the printed portion 310-p of FIG. 3A. In alternative embodiments of FIGS. 3A-3C, energy absorbing material may additionally or alternatively be locally and/or globally disposed on both sides of the film, and/or between layers of the flexible material, and/or within one or more layers of the flexible material (e.g. as an additive), in any workable combination; and/or shielding material may additionally or alternatively be locally and/or globally disposed between layers of the flexible material, and/or within one or more layers of the flexible material, in any workable combination.

FIG. 4A is a side view of a continuous web of flexible material 410 configured to be formed into flexible packages, wherein the flexible material 410 comprises a film 410-$f$ and includes an unprinted portion 410-$u$, a printed portion 410-$p$, and a shielded portion 410-$s$, wherein the flexible material 410 moves 410-$m$ (using web handling equipment, not shown) proximate to a printer 420-$e$, which prints energy absorbing material 420 (shown as phantom lines) onto portions of one side of the film 410-$f$, such that the energy absorbing material 420 is locally disposed on the one (near) side of the flexible material 410 in the printed portion 410-$p$, and the flexible material 410 moves 410-$m$ proximate to a printer 430-$e$, which prints shielding material 430-$ls$ (shown with hidden lines) onto portions of the other (far) side of the film 410-$f$, such that shielding material 430-$ls$ is locally disposed on the other side of the flexible material 410 (opposite from the side with the energy absorbing material 420) in the shielded portion 410-$s$, and such that the shielding material 430-$ls$ covers at least the same portions of the film 410-$f$ on which the energy absorbing material 420 is disposed, wherein the portions with the energy absorbing material 420 are configured to at least contribute to self-folding when activation energy is subsequently applied (as described herein), and the portions with the shielding material 430-$ls$ are configured to at least assist in preventing such activation energy from passing through. FIG. 4B is an end view of the flexible material 410 of FIG. 4A, which shows that the flexible material 410 is substantially flat and unfolded. FIG. 4C is an enlarged, partial, cross-sectional view of part of the printed portion 410-$p$ of FIG. 4A. In alternative embodiments of FIGS. 4A-4C, energy absorbing material may additionally or alternatively be locally and/or globally disposed on both sides of the film, and/or between layers of the flexible material, and/or within one or more layers of the flexible material (e.g. as an additive), in any workable combination; and/or shielding material may additionally or alternatively be locally and/or globally disposed between layers of the flexible material, and/or within one or more layers of the flexible material, in any workable combination.

FIG. 5A is a side view of a continuous web of unshielded flexible material 510 configured to be formed into flexible packages, wherein the flexible material 510 comprises a film 510-$f$ and includes an unprinted portion 510-$u$ as well as a printed portion 510-$p$ (and since the flexible material 510 does not include a layer of shielding material, the flexible material 510 is considered to be unshielded), wherein the flexible material 510 moves 510-$m$ (using web handling equipment, not shown) proximate to a printer 520-$e$, which prints energy absorbing material 520 onto portions of one side of the film 510-$f$, such that the energy absorbing material 520 is disposed all over the one (near) side of the flexible material 510 in the printed portion 510-$p$. FIG. 5B is an end view of the flexible material 510 of FIG. 5A, which shows that the flexible material 510 is substantially flat and unfolded, wherein the energy absorbing material 520 is configured to at least contribute to self-folding when activation energy is subsequently applied (as described herein). FIG. 5C is an enlarged, partial, cross-sectional view of part of the printed portion 510-$p$ of FIG. 5A. In alternative embodiments of FIGS. 5A-5C, energy absorbing material may additionally or alternatively be locally and/or globally disposed on both sides of the flexible material, and/or between layers of the flexible material, and/or within one or more layers of the flexible material (e.g. as an additive), in any workable combination.

FIG. 6A is a side view of a continuous web of shielded flexible material 610 configured to be formed into flexible packages, wherein the flexible material 610 comprises a film 610-$f$ and a layer 630-$gs$ of shielding material on one (far) side within a shielded portion 610-$s$, and includes an unprinted portion 610-$u$ as well as a printed portion 610-$p$, wherein the flexible material 610 moves 610-$m$ (using web handling equipment, not shown) proximate to a printer 620-$e$, which prints energy absorbing material 620 onto the other (near) side of the film 610-$f$, such that the energy absorbing material 620 is disposed all over the other side of the flexible material 610 (opposite from the side with the layer 630-$gs$ of shielding material) in the printed portion 610-$p$, wherein the energy absorbing material 620 is configured to at least contribute to self-folding when activation energy is subsequently applied (as described herein), and the layer 630-$gs$ of shielding material is configured to at least assist in preventing such activation energy from passing through. FIG. 6B is an end view of the flexible material 610 of FIG. 6A, which shows that the flexible material 610 is substantially flat and unfolded. FIG. 6C is an enlarged, partial, cross-sectional view of part of the printed portion 610-$p$ of FIG. 6A. In alternative embodiments of FIGS. 6A-6C, energy absorbing material may additionally or alternatively be locally and/or globally disposed on both sides of the film, and/or between layers of the flexible material, and/or within one or more layers of the flexible material (e.g. as an additive), in any workable combination; and/or shielding material may additionally or alternatively be locally and/or globally disposed between layers of the flexible material, and/or within one or more layers of the flexible material, in any workable combination.

FIG. 7A is a side view of a continuous web of flexible material 710 configured to be formed into flexible packages, wherein the flexible material 710 comprises a film 710-$f$ and includes an unprinted portion 710-$u$, a printed portion 710-$p$, and a shielded portion 710-$s$, wherein the flexible material 710 moves 710-$m$ (using web handling equipment, not shown) proximate to a printer 720-$e$, which prints energy absorbing material 720 onto one (near) side of the film 710-$f$, such that the energy absorbing material 720 is disposed all over the one side of the flexible material 710 in the printed portion 710-$p$, and the flexible material 710 moves 710-$m$ proximate to a printer 730-$e$, which prints shielding material 730-$ls$ (shown with hidden lines) onto portions of the other (far) side of the film 710-$f$, such that the shielding material 730-$ls$ is locally disposed on the other side of the flexible material (opposite from the side with the energy absorbing material 720) in the shielded portion 710-$s$, and such that the shielding material 730-$ls$ covers at least the portions of the film 710-$f$ to which activation energy (e.g. a directed beam) will be applied, wherein the energy absorbing material 720 is configured to at least contribute to self-folding when activation energy is subsequently applied (as described herein), and the portions with the shielding material 730-$ls$ are configured to at least assist in preventing such activation energy from passing through. FIG. 7B is an end view of the flexible material 710 of FIG. 7A, which shows that the flexible material 710 is substantially flat and unfolded. FIG. 7C is an enlarged, partial, cross-sectional view of part of the printed portion 710-$p$ of FIG. 7A. In alternative embodiments of FIGS. 7A-7C, energy absorbing material may additionally or alternatively be locally and/or globally disposed on both sides of the film, and/or between layers of the flexible material, and/or within one or more layers of the flexible material (e.g. as an additive), in any workable combination; and/or shielding material may additionally or alternatively be locally and/or globally disposed between layers of the flexible material, and/or within one or more layers of the flexible material, in any workable combination.

FIG. 8A is a side view of a continuous web of flexible material 810, which can be the printed portion 210-*p* of the flexible material 210 from FIGS. 2A-2C, the printed portion 310-*p* of the flexible material 320 from FIGS. 3A-3C, the printed portion 410-*p* of the flexible material 420 from FIGS. 4A-4C, or any alternative embodiment of any of these; the flexible material 810 has portions disposed with energy absorbing material 820 (shown as phantom lines) and is configured to be formed into flexible packages, wherein the flexible material 810 includes a printed but unactivated portion 810-*p* and an activated portion 810-*a*, wherein the flexible material 810 moves 810-*m* proximate to an energy source 860-*e*, which applies a field 861 of activation energy to the flexible material 810, such that at least portions of the flexible material 810 absorb the activation energy, are heated by that energy, and by differential thermal behavior (e.g. expansion and/or contraction) self-fold to form folds 866, which are self-folds, along the portions disposed with the energy absorbing material 820; however, in various embodiments, the self-folding may form part, parts, or about all, or approximately all, or substantially all, or nearly all, or all of some or all of the folds 866. FIG. 8B is an end view of the flexible material 810 of FIG. 8A, which shows that portions of the flexible material 810 remain flat while the folds 866 and the portions of the flexible material 810 adjacent to the folds 866 protrude outward. In alternative embodiments of FIGS. 8A-8B, one or more energy sources of any suitable kind can be disposed on either or both sides of the flexible material, at any convenient distance and/or orientation, to transmit activation energy to the flexible material.

FIG. 9A is a side view of a continuous web of flexible material 910, which can be the printed portion 210-*p* of the flexible material 210 from FIGS. 2A-2C, the printed portion 310-*p* of the flexible material 320 from FIGS. 3A-3C, the printed portion 410-*p* of the flexible material 420 from FIGS. 4A-4C, or any alternative embodiment of any of these; the flexible material 910 has portions disposed with energy absorbing material 920 (shown as phantom lines) and is configured to be formed into flexible packages, wherein the flexible material 910 includes a printed but unactivated portion 910-*p* and an activated portion 910-*a*, wherein the flexible material 910 moves 910-*m* proximate to an energy source 960-*e*, in the form of a plurality of emitters which together apply a field 962 of activation energy to the flexible material 910, such that at least portions of the flexible material 910 absorb the activation energy, are heated by that energy, and by differential thermal behavior (e.g. expansion and/or contraction) self-fold to form folds 966, which are self-folds, along the portions disposed with the energy absorbing material 920; however, in various embodiments, the self-folding may form part, parts, or about all, or approximately all, or substantially all, or nearly all, or all of some or all of the folds 966. FIG. 9B is an end view of the flexible material 910 of FIG. 9A, which shows that portions of the flexible material 910 remain flat while the folds 966 and the portions of the flexible material 910 adjacent to the folds 966 protrude outward. In alternative embodiments of FIGS. 9A-9B, one or more energy sources of any suitable kind can be disposed on either or both sides of the flexible material, at any convenient distance and/or orientation, to transmit activation energy to the flexible material.

FIG. 10A is a side view of a continuous web of flexible material 1010, which can be the printed portion 210-*p* of the flexible material 210 from FIGS. 2A-2C, the printed portion 310-*p* of the flexible material 310 from FIGS. 3A-3C, the printed portion 410-*p* of the flexible material 410 from FIGS. 4A-4C, or any alternative embodiment of any of these; the flexible material 1010 has portions disposed with energy absorbing material 1020 (shown as phantom lines) and is configured to be formed into flexible packages, wherein the flexible material 1010 includes a printed but unactivated portion 1010-*p* and an activated portion 1010-*a*, wherein the flexible material 1010 moves 1010-*m* proximate to an energy source 1060-*e*, in the form of an emitter which applies a moving 1063-*m* beam 1063 of directed activation energy to selected portions of the flexible material 1010, wherein the selected portions include the portions disposed with the energy absorbing material 1020, such that at least portions of the flexible material 1010 absorb the activation energy, are heated by that energy, and by differential thermal behavior (e.g. expansion and/or contraction) self-fold to form folds 1066, which are self-folds, along the portions disposed with the energy absorbing material 1020; however, in various embodiments, the self-folding may form part, parts, or about all, or approximately all, or substantially all, or nearly all, or all of some or all of the folds 1066. FIG. 10B is an end view of the flexible material 1010 of FIG. 10A, which shows that portions of the flexible material 1010 remain flat while the folds 1066 and the portions of the flexible material 1010 adjacent to the folds 1066 protrude outward. In alternative embodiments of FIGS. 10A-10C, the flexible material 1010 may instead be the printed portion 510-*p* of flexible material 510 from FIGS. 5A-5C, the printed portion 610-*p* of flexible material 620 from FIGS. 6A-6C, the printed portion 710-*p* of flexible material 720 from FIGS. 7A-7C, or any alternative embodiment of any of these, wherein the emitter 1060-*e* applies the moving 1063-*m* beam 1063 of directed activation energy to selected portions of the flexible material 1010, which has energy absorbing material disposed all over one side of the flexible material, but only the portions activated by the beam 1063 self-fold to form folds 1066 in the flexible material 1010; however, in various embodiments, such self-folding may form part, parts, or about all, or approximately all, or substantially all, or nearly all, or all of some or all of the folds 1066.

FIGS. 11A-21A describe and illustrate various embodiments of flexible packages formed of flexible materials, wherein the flexible materials include energy absorbing material and (optionally) shielding material. In these embodiments, the flexible materials are described and illustrated as stand-up pouches having bottom folds (e.g. gussets), side seals, and top closures, however this form and these features are not required and the flexible packages can take any convenient form described herein or known in the art; any of these flexible packages can be formed into flexible packages in any way described herein or known in the art. In these embodiments, the energy absorbing material is configured to at least contribute to self-folding when activation energy is subsequently applied, and can take any form described herein or known in the art; while the energy absorbing material is described and illustrated as disposed on particular portions of the flexible materials, these particular portions are exemplary and non-limiting; energy absorbing material can be disposed in any particular line(s), pattern(s), and/or other arrangement, of any size, shape, and number to cause the desired self-folding behavior. Also, in these embodiments, while energy absorbing materials are described as being printed onto flexible materials, such materials can be locally and/or globally disposed on flexible materials using any deposition method known in the art. Further, in these embodiments, the shield and/or shielding material is configured to at least assist in preventing such activation energy from passing through, and can take any form described herein or known in the art. For any of the flexible packages of FIGS. 11A-21A, activation energy can be subsequently applied in any way described herein or known in the art.

FIG. 11A is a front view of an at least partially formed, empty flexible package 1107-e, made of a flexible material that comprises a film 1110-f and includes an unprinted portion 1107-u as well as a printed portion 1107-p and also comprises a bottom fold 1108 made by a contact process (such as mechanical folding), two side seals 1109 made by a contact process (such as mechanical sealing), and a top closure 1106, wherein the flexible package 1107-e moves 1107-m (using package handling equipment, not shown) proximate to a printer 1120-e, which prints energy absorbing material 1120 (shown as phantom lines) onto outer portions of the film 1110-f, such that the energy absorbing material 1120 is locally disposed on the front of the flexible package 1107-e in the printed portion 1107-p, wherein the portions with the energy absorbing material 1120 are configured to at least contribute to self-folding when activation energy is subsequently applied (as described herein). FIG. 11B is a side view of the flexible package 1107-e of FIG. 11A, which shows that the flexible material is substantially flat and unfolded. In alternative embodiments of FIGS. 11A-11B, energy absorbing material may additionally or alternatively be locally and/or globally disposed on both inner and outer portions of the flexible material, and/or between layers of the flexible material, and/or within one or more layers of the flexible material (e.g. as an additive), and/or on both the front and the back of the flexible package, in any workable combination. In other alternative embodiments of FIGS. 11A-11B, the flexible package may not include (separately added) energy absorbing material, but may be otherwise configured (e.g. with adjacent layers of material having differing degrees of energy absorption) to self fold when activation energy is applied, as described herein.

FIG. 12A is a front view of an at least partially formed, empty flexible package 1207-e, which can be the flexible package 1107-e (configured according to the printed portion 1107-p) from FIGS. 11A-11B (with like-numbered elements configured in the same way), or any other flexible package described herein, or any alternative embodiment of any of these; the flexible package 1207-e has an open top, into which a shielding plate 1235 is temporarily inserted (by a mechanical apparatus, not shown); the shielding plate 1235 is a thin, substantially rigid, flat plate that is configured with material (e.g. metal), dimensions (e.g. height and width appropriate for the package and its product(s)), and location (e.g. inserted position) such that, when the flexible package 1207-e is filled with one or more products and activation energy is applied to the filled package, the temporary shielding plate at least partially (or even completely) shields the one or more products from the activation energy, by blocking the energy with its intermediate presence between the product(s) and the source(s) of the activation energy; after the activation energy is applied, the shielding plate 1235 can be withdrawn (by the mechanical apparatus) so the flexible package 1207-e can be closed. FIG. 12B is a side view of the flexible package 1207-e of FIG. 12A, which shows that the flexible material of the package is unfolded. FIG. 12C is a side view of the flexible package 1207-f, which is the flexible package 1207-e of FIG. 12A subsequently filled with a plurality of products 1255, which are disposed behind the shielding plate 1235, in a back portion of the flexible package 1207-f, such that the products 1255 are shielded by the shielding plate 1235 from activation energy applied to the front of the flexible package 1207-f. In alternative embodiments of FIGS. 12A-12C, the shielding plate can be replaced with any number of any kind of temporary shields, having any workable size and shape, and/or a temporary shield can be inserted into a flexible package through another opening, and/or a temporary shield can be inserted into a flexible package during or after the filling of some or all the product(s) into the package.

FIG. 13A is a front view of an at least partially formed, empty flexible package 1307-e, which can be the flexible package 1107-e (configured according to the printed portion 1107-p) from FIGS. 11A-11B (with like-numbered elements configured in the same way), or any other flexible package described herein, or any alternative embodiment of any of these; the flexible package 1307-e has an open top, into which a shielding material 1336 is inserted by a mechanical apparatus 1338; the shielding material 1336 is a thin, flexible sheet that is configured with material (e.g. metallization), dimensions (e.g. height and width appropriate for the package and its product(s)), and location (e.g. inserted position) such that, when the flexible package 1307-e is filled with one or more products and activation energy is applied to the filled package, the shielding material at least partially (or even completely) shields the one or more products from the activation energy, by blocking the energy with its intermediate presence between the product(s) and the source(s) of the activation energy; after the activation energy is applied, the shielding material can be closed within the flexible package (or can be optionally withdrawn). FIG. 13B is a side view of the flexible package 1307-e of FIG. 13A, which shows that the flexible material of the package is unfolded. FIG. 13C is an side view of flexible package 1307-f, which is the flexible package 1307-e of FIG. 13A subsequently filled with a plurality of products 1355, which are disposed behind the shielding material 1336, in a back portion of the flexible package 1307-f, such that the products 1255 are shielded by the shielding plate 1235 from activation energy applied to the front of the flexible package 1207-f. In alternative embodiments of FIGS. 13A-13C, the shielding material can be replaced with any number of any kind of shielding materials, having any workable size and shape, and/or a shielding material can be inserted into a flexible package through another opening, and/or a shielding material can be inserted into a flexible package during or after the filling of some or all of the product(s) into the package, and/or a shielding material can be used to form a pouch that holds the product(s) while the pouch is inserted into the flexible package.

FIG. 14A is a front view of an at least partially formed, empty flexible package 1407-e, which can be made from the printed portion 210-p of the flexible material 210 from FIGS. 2A-2C, the printed portion 310-p of the flexible material 320 from FIGS. 3A-3C, the printed portion 410-p of the flexible material 420 from FIGS. 4A-4C, or which can be the flexible package 1107-e (configured according to the printed portion 1107-p) from FIGS. 11A-11B, the flexible package 1207-e from FIGS. 12A-12B (including a temporarily inserted shield, not shown), the flexible package 1307-e from FIGS. 13A-13B (including an inserted shielding material, not shown), or any other flexible package described herein, or any alternative embodiment of any of these, wherein the unfilled flexible package 1407-*e* is made of a flexible material that comprises a film 1410-*f* and has portions disposed with energy absorbing material 1420 (shown as phantom lines), a printed but unactivated portion 1407-*p*, and an activated portion 1407-*a* and also comprises a bottom fold 1408 made by a contact process (such as mechanical folding), two side seals 1409 made by a contact process (such as mechanical sealing), and a top closure 1406, wherein the flexible package 1407-*e* moves 1407-*m* (using package handling equipment, not shown) proximate to an energy source 1460-*e*, which applies a field 1461 of activation energy to the flexible package 1407-*e*, such that at least portions of the flexible material 1410-*f* absorb the activation energy, are heated by that energy, and by differential thermal behavior (e.g. expansion and/or contraction) self-fold to form folds 1466, which are self-folds, along the portions disposed with the energy absorbing material 1420; however, in various embodiments, the self-folding may form part, parts, or about all, or approximately all, or substantially all, or nearly all, or all of some or all of the folds 1466. FIG. 14B is a side view of the unfilled flexible package 1407-*e* of FIG. 14A, which shows that portions of the flexible material 1410-*f* remain flat while the folds 1466 and the portions of the flexible material 1410-*f* adjacent to the folds 1466 protrude outward. In alternative embodiments of FIGS. 14A-14B, one or more energy sources of any suitable kind can be disposed on either or both sides of the flexible package, at any convenient distance and/or orientation, to transmit activation energy to the flexible material(s).

FIG. 15A is a front view of an at least partially formed, empty flexible package 1507-*e*, which can be made from the printed portion 210-*p* of the flexible material 210 from FIGS. 2A-2C, the printed portion 310-*p* of the flexible material 320 from FIGS. 3A-3C, the printed portion 410-*p* of the flexible material 420 from FIGS. 4A-4C, or which can be the flexible package 1107-*e* (configured according to the printed portion 1107-*p*) from FIGS. 11A-11B, the flexible package 1207-*e* from FIGS. 12A-12B (including a temporarily inserted shield, not shown), the flexible package 1307-*e* from FIGS. 13A-13B (including an inserted shielding material, not shown), or any other flexible package described herein, or any alternative embodiment of any of these, wherein the unfilled flexible package 1507-*e* is made of a flexible material that comprises a film 1510-*f* and has portions disposed with energy absorbing material 1520 (shown as phantom lines), a printed but unactivated portion 1507-*p*, and an activated portion 1507-*a* and also comprises a bottom fold 1508 made by a contact process (such as mechanical folding), two side seals 1509 made by a contact process (such as mechanical sealing), and a top closure 1506, wherein the flexible package 1507-*e* moves 1507-*m* (using package handling equipment, not shown) proximate to an energy source 1560-*e*, in the form of a plurality of emitters which together apply a field 1561 of activation energy to the flexible package 1507-*e*, such that at least portions of the flexible material 1510-*f* absorb the activation energy, are heated by that energy, and by differential thermal behavior (e.g. expansion and/or contraction) self-fold to form folds 1566, which are self-folds, along the portions disposed with the energy absorbing material 1520; however, in various embodiments, the self-folding may form part, parts, or about all, or approximately all, or substantially all, or nearly all, or all of some or all of the folds 1566. FIG. 15B is a side view of the unfilled flexible package 1507-*e* of FIG. 15A, which shows that portions of the flexible material 1510-*f* remain flat while the folds 1566 and the portions of the flexible material 150-*f* adjacent to the folds 1566 protrude outward. In alternative embodiments of FIGS. 15A-15B, one or more energy sources of any suitable kind can be disposed on either or both sides of the flexible package, at any convenient distance and/or orientation, to transmit activation energy to the flexible material(s).

FIG. 16A is a front view of an at least partially formed, empty flexible package 1607-*e*, which can be made from the printed portion 210-*p* of the flexible material 210 from FIGS. 2A-2C, the printed portion 310-*p* of the flexible material 310 from FIGS. 3A-3C, the printed portion 410-*p* of the flexible material 410 from FIGS. 4A-4C, or which can be the flexible package 1107-*e* (configured according to the printed portion 1107-*p*) from FIGS. 11A-11B, the flexible package 1207-*e* from FIGS. 12A-12B (including a temporarily inserted shield, not shown), the flexible package 1307-*e* from FIGS. 13A-13B (including an inserted shielding material, not shown), or any other flexible package described herein, or any alternative embodiment of any of these, wherein the unfilled flexible package 1607-*e* is made of a flexible material that comprises a film 1610-*f* and has portions disposed with energy absorbing material 1620 (shown as phantom lines), a printed but unactivated portion 1607-*p*, and an activated portion 1607-*a* and also comprises a bottom fold 1608 made by a contact process (such as mechanical folding), two side seals 1609 made by a contact process (such as mechanical sealing), and a top closure 1606, wherein the flexible package 1607-*e* moves 1607-*m* (using package handling equipment, not shown) proximate to an energy source 1660-*e*, in the form of an emitter which applies a moving 1663-*m* beam 1663 of directed activation energy to selected portions of the flexible material 1610-*f*, such that at least portions of the flexible material 1610-*f* absorb the activation energy, are heated by that energy, and by differential thermal behavior (e.g. expansion and/or contraction) self-fold to form folds 1666, which are self-folds, along the portions disposed with the energy absorbing material 1620; however, in various embodiments, the self-folding may form part, parts, or about all, or approximately all, or substantially all, or nearly all, or all of some or all of the folds 1666. FIG. 16B is a side view of the unfilled flexible package 1607-*e* of FIG. 16A, which shows that portions of the flexible material 1610-*f* remain flat while the folds 1666 and the portions of the flexible material 1610-*f* adjacent to the folds 1666 protrude outward. In alternative embodiments of FIGS. 16A-16B, one or more energy sources of any suitable kind can be disposed on either or both sides of the flexible package, at any convenient distance and/or orientation, to transmit a beam of directed activation energy to the flexible material(s). In other alternative embodiments of FIGS. 16A-16B, the flexible material 1610-*f* may instead be the printed portion 510-*p* of flexible material 510 from FIGS. 5A-5C, the printed portion 610-*p* of flexible material 620 from FIGS. 6A-6C, the printed portion 710-*p* of flexible material 720 from FIGS. 7A-7C, or any alternative embodiment of any of these, wherein the emitter 1660-*e* applies the moving 1663-*m* beam 1663 of directed activation energy to selected portions of the flexible material 1610-*f*, which has energy absorbing material disposed all over one side of the flexible material, but only the portions activated by the beam 1663 self-fold to form folds 1666 in the flexible material 1610-*f*; however, in various embodiments, such self-folding may form part, parts, or about all, or approximately all, or substantially all, or nearly all, or all of some or all of the folds 1666.

FIG. 17A is a front view of a partially formed, filled flexible package 1707-*f*, made of a flexible material that comprises a film 1710-*f* and includes an unprinted portion 1707-*u* as well as a printed portion 1707-*p* and also comprises a bottom fold 1708 made by a contact process (such as mechanical folding), two side seals 1709 made by a contact process (such as mechanical sealing), and a top closure 1706, wherein the flexible package 1707-*f* moves 1707-*m* (using package handling equipment, not shown) proximate to a printer 1720-*e*, which prints energy absorbing material 1720 (shown as phantom lines) onto outer portions of the film 1710-*f*, such that the energy absorbing material 1720 is locally disposed on the front of the flexible package 1707-*f* in the printed portion 1707-*p*, wherein the portions with the energy absorbing material 1720 are configured to at least contribute to self-folding when activation energy is subsequently applied (as described herein). FIG. 17B is a side view of the flexible package 1707-*f* of FIG. 17A, which shows that the flexible material is filled but unfolded. In alternative embodiments of FIGS. 17A-17B, energy absorbing material may additionally or alternatively be locally and/or globally disposed on both inner and outer portions of the flexible material, and/or between layers of the flexible material, and/or within one or more layers of the flexible material (e.g. as an additive), and/or on both the front and the back of the flexible package, in any workable combination. In other alternative embodiments of FIGS. 17A-17B, the flexible package may not include (separately added) energy absorbing material, but may be otherwise configured (e.g. with adjacent layers of material having differing degrees of energy absorption) to self fold when activation energy is applied, as described herein.

FIG. 18A is a front view of an at least partially formed, filled flexible package 1807-*f*, which can be made from the printed portion 210-*p* of the flexible material 210 from FIGS. 2A-2C, the printed portion 310-*p* of the flexible material 310 from FIGS. 3A-3C, the printed portion 410-*p* of the flexible material 410 from FIGS. 4A-4C, or made from any other flexible material described herein, or which can be a filled version of the flexible package 1107-*e* (configured according to the printed portion 1107-*p*) from FIGS. 11A-11B, a filled version of the flexible package 1207-*e* from FIGS. 12A-12B (including a temporarily inserted shield, not shown), a filled version of the flexible package 1307-*e* from FIGS. 13A-13B (including an inserted shielding material, not shown), or a fully printed version of the filled flexible package 1707-*f* from FIGS. 17A-17B, or a filled version of any other flexible package described herein, or any alternative embodiment of any of these, wherein the filled flexible package 1807-*f* is made of a flexible material that comprises a film 1810-*f* and has portions disposed with energy absorbing material 1820 (shown as phantom lines), a printed but unactivated portion 1810-*p*, and an activated portion 1810-*a*, and is filled with a plurality of products 1855 and also comprises a bottom fold 1808 made by a contact process (such as mechanical folding), two side seals 1809 made by a contact process (such as mechanical sealing), and a top closure 1806, wherein the filled flexible package 1807-*f* moves 1807-*m* (using package handling equipment, not shown) proximate to an energy source 1860-*e*, which applies a field 1861 of activation energy to the flexible package 1807-*f*, such that at least portions of the flexible material 1810-*f* absorb the activation energy, are heated by that energy, and by differential thermal behavior (e.g. expansion and/or contraction) self-fold to form folds 1866, which are self-folds, along the portions disposed with the energy absorbing material 1820; however, in various embodiments, the self-folding may form part, parts, or about all, or approximately all, or substantially all, or nearly all, or all of some or all of the folds 1866. FIG. 18B is a front view of the filled flexible package 1807-*f* of FIG. 18A, when the entire flexible package 1807-*f* is fully formed and configured according to the activated portion 1810-*a* of FIG. 18A, such that all of the self-folds 1866 have formed, and the products 1855 have settled to the bottom of the flexible package 1807-*f*. FIG. 18C is a side view of the filled flexible package 1807-*f* of FIG. 18B, which shows that the folds 1866 and the portions of the flexible material 1810-*f* adjacent to the folds 1866 protrude outward; in the embodiment of FIG. 18C, the back of the flexible package 1807-*f* is configured in the same way as the front. In alternative embodiments of FIGS. 18A-18C, one or more energy sources of any suitable kind can be disposed on either or both sides of the flexible package, at any convenient distance and/or orientation, to transmit activation energy to the flexible material(s).

FIG. 19A is a front view of an at least partially formed, filled flexible package 1907-*f*, which can be made from the printed portion 210-*p* of the flexible material 210 from FIGS. 2A-2C, the printed portion 310-*p* of the flexible material 310 from FIGS. 3A-3C, the printed portion 410-*p* of the flexible material 410 from FIGS. 4A-4C, or made from any other flexible material described herein, or which can be a filled version of the flexible package 1107-*e* (configured according to the printed portion 1107-*p*) from FIGS. 11A-11B, a filled version of the flexible package 1207-*e* from FIGS. 12A-12B (including a temporarily inserted shield, not shown), a filled version of the flexible package 1307-*e* from FIGS. 13A-13B (including an inserted shielding material, not shown), or a fully printed version of the filled flexible package 1707-*f* from FIGS. 17A-17B (configured according to the printed portion 1707-*p*), or a filled version of any other flexible package described herein, or any alternative embodiment of any of these, wherein the filled flexible package 1907-*f* is made of a flexible material that comprises a film 1910-*f* and has portions disposed with energy absorbing material 1920 (shown as phantom lines), a printed but unactivated portion 1907-*p*, and an activated portion 1907-*a*, and is filled with a plurality of products 1955 and also comprises a bottom fold 1908 made by a contact process (such as mechanical folding), two side seals 1909 made by a contact process (such as mechanical sealing), and a top closure 1906, wherein the filled flexible package 1907-*f* moves 1907-*m* (using package handling equipment, not shown) proximate to an energy source 1960-*e*, in the form of a plurality of emitters which together apply a field 1961 of activation energy to the flexible package 1907-*f*, such that at least portions of the flexible material 1910-*f* absorb the activation energy, are heated by that energy, and by differential thermal behavior (e.g. expansion and/or contraction) self-fold to form folds 1966, which are self-folds, along the portions disposed with the energy absorbing material 1920; however, in various embodiments, the self-folding may form part, parts, or about all, or approximately all, or substantially all, or nearly all, or all of some or all of the folds 1966. FIG. 19B is a front view of the filled flexible package 1907-*f* of FIG. 19A, when the entire flexible package 1907-*f* is fully formed and configured according to the activated portion 1910-*a* of FIG. 19A, such that all of the self-folds 1966 have formed, and the products 1955 have settled to the bottom of the flexible package 1907-*f*. FIG. 19C is a side view of the filled flexible package 1907-*f* of FIG. 19B, which shows that the folds 1966 and the portions of the flexible material 1910-*f* portions adjacent to the folds 1966 protrude outward; in the embodiment of FIG. 19C, the back of the flexible package 1907-*f* is configured in the same way as the front. In alternative embodiments of FIGS. 19A-19C, one or more energy sources of any suitable kind can be disposed on either or both sides of the flexible package, at any convenient distance and/or orientation, to transmit activation energy to the flexible material(s).

FIG. 20A is a front view of an at least partially formed, filled flexible package 2007-*f*, which can be made from the printed portion 210-*p* of the flexible material 210 from FIGS. 2A-2C, the printed portion 310-*p* of the flexible material 310 from FIGS. 3A-3C, the printed portion 410-*p* of the flexible material 410 from FIGS. 4A-4C, or made from any other flexible material described herein, or which can be a filled version of the flexible package 1107-*e* (configured according to the printed portion 1107-*p*) from FIGS. 11A-11B, a filled version of the flexible package 1207-*e* from FIGS. 12A-12B (including a temporarily inserted shield, not shown), a filled version of the flexible package 1307-*e* from FIGS. 13A-13B (including an inserted shielding material, not shown), or a fully printed version of the filled flexible package 1707-*f* from FIGS. 17A-17B (configured according to the printed portion 1707-*p*), or a filled version of any other flexible package described herein, or any alternative embodiment of any of these, wherein the filled flexible package 2007-*f* is made of a flexible material that comprises a film 2010-*f* and has portions disposed with energy absorbing material 2020 (shown as phantom lines), a printed but unactivated portion 2007-*p*, and an activated portion 2007-*a*, and is filled with a plurality of products 2055 and also comprises a bottom fold 2008 made by a contact process (such as mechanical folding), two side seals 2009 made by a contact process (such as mechanical sealing), and a top closure 2006, wherein the filled flexible package 2007-*f* moves 2007-*m* (using package handling equipment, not shown) proximate to an energy source 2060-*e*, in the form of an emitter which applies a moving 2063-*m* beam 2063 of directed activation energy to selected portions of the flexible material 2010-*f*, such that at least portions of the flexible material 2010-*f* absorb the activation energy, are heated by that energy, and by differential thermal behavior (e.g. expansion and/or contraction) self-fold to form folds 2066, which are self-folds, along the portions disposed with the energy absorbing material 2020; however, in various embodiments, the self-folding may form part, parts, or about all, or approximately all, or substantially all, or nearly all, or all of some or all of the folds 2066. FIG. 20B is a front view of the filled flexible package 2007-*f* of FIG. 20A, when the entire flexible package 2007-*f* is fully formed and configured according to the activated portion 2010-*a* of FIG. 20A, such that all of the self-folds 2066 have formed, and the products 2055 have settled to the bottom of the flexible package 2007-*f*. FIG. 20C is a side view of the filled flexible package 2007-*f* of FIG. 20B, which shows that the folds 2066 and the portions of the flexible material 2010-*f* portions adjacent to the folds 2066 protrude outward; in the embodiment of FIG. 20C, the back of the flexible package 2007-*f* is configured in the same way as the front. In alternative embodiments of FIGS. 20A-20C, one or more energy sources of any suitable kind can be disposed on either or both sides of the flexible package, at any convenient distance and/or orientation, to transmit activation energy to the flexible material(s).

Figure 21A:
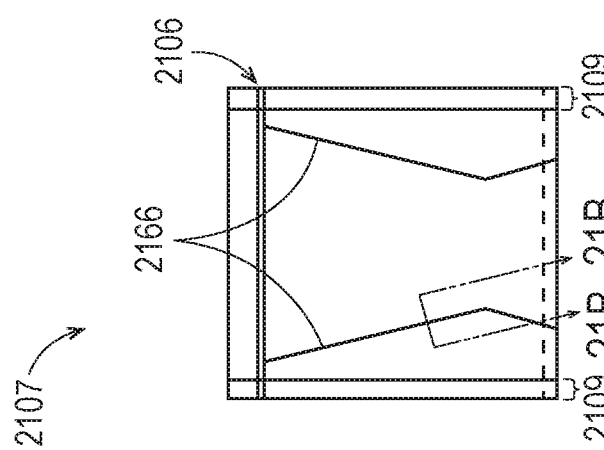
FIG. 21A is a front view of a self-folded flexible package.
Figure 21B:
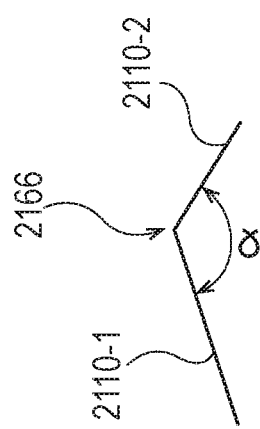
FIG. 21B is a partial cross-sectional view of the flexible package of FIG. 21A.

FIG. 21A is a front view of a fully formed flexible package 2107, which can be a flexible package formed by the process 100, according to any embodiments disclosed herein, including any alternative embodiments. The flexible package 2107 includes a bottom fold 2108 made by a contact process (such as mechanical folding), two side seals 2109 made by a contact process (such as mechanical sealing), and a top closure 2106, as well as folds 2166, which are self-folds, which can be configured according to any of the self-folds described herein. FIG. 21B is a partial cross-sectional view of part of a front of the flexible package 2107 of FIG. 21A, including self-fold 2166, which separates a first panel 2110-1 of flexible material from a second panel of flexible material 2110-2. Each of the panels 2110-1 and 2110-2 is about flat, however, in various embodiments, part, parts, or all either or both panels can be about flat, substantially flat, approximately flat, nearly flat, or completely flat. As an example, the part or parts of any panel that are adjacent to a self-fold may be about flat, substantially, approximately flat, nearly flat, or completely flat, while part or parts of the panel that are not adjacent to the self-fold may be less flat or not flat at all. The first panel 2110-1 and the second panel 2110-2 are disposed at an angle, a, with respect to each other, at the self-fold 2166. The angle α can be 110-170 degrees, or any integer value for degrees between 110 and 170, or any range formed by any of these values, such as 110-160 degrees, 120-150 degrees, etc. Any of the self-folds described herein can be configured with any such angles.

Definitions

As used herein, the term "about" modifies a particular value, by referring to a range equal to the particular value, plus or minus twenty percent (+/−20%). The term "about" can also be used to modify a particular condition, by referring to a range of conditions that are within twenty percent (+/−20%) of the particular condition. For any of the embodiments of flexible containers, disclosed herein, any disclosure of a particular value or condition is also intended to be a disclosure of various alternative embodiments of that flexible container, with the value or condition being variable within the range of about (i.e. within 20%).

As used herein, the term "approximately" modifies a particular value, by referring to a range equal to the particular value, plus or minus fifteen percent (+/−15%). The term "approximately" can also be used to modify a particular condition, by referring to a range of conditions that are within fifteen percent (+/−15%) of the particular condition. For any of the embodiments of flexible containers, disclosed herein, any disclosure of a particular value or condition is also intended to be a disclosure of various alternative embodiments of that flexible container, with the value or condition being variable within the range of approximately (i.e. within 15%).

As used herein, the term "directly connected" refers to a configuration wherein elements are attached to each other without any intermediate elements therebetween, except for any means of attachment (e.g. adhesive).

As used herein, when referring to a flexible package, the term "disposable" refers to a package which, after dispensing a product to an end user, is not configured to be refilled with an additional amount of the product, but is configured to be disposed of (i.e. as waste, compost, and/or recyclable material(s)). Part, parts, or all of any of the embodiments of flexible packages, disclosed herein, can be configured to be disposable.

As used herein, the term "energy absorbing material" refers to material configured to absorb activation energy and be heated by that energy, in order to induce self-folding in a flexible material. Some examples of energy absorbing materials, which can be added into plastic films, and are known in the art, include: "natural silicates . . . , silica, calcium carbonate, barium sulphate, aluminum hydrate, and metallic hydroxysulphates . . . boron-oxygen compounds . . . boric acid, alkaline and alkaline earth borates, aluminum borate, zinc borate, and andhydrous borax" as disclosed by U.S. Pat. No. 4,559,381 (col. 1, lines 42-44; col. 3, lines 1-3) to Tapia, et al. entitled "Polymeric Covering Materials for Growing Plants or Crops." Other energy absorbing additives commonly included in plastic films, to provide various functions, can also act as energy-receptive additives, such as: "fillers, colourants, release agents, UV retardants, flame retardants, etc." as disclosed on page 1622 of the Handbook of Laser Technology an Applications; Volume III Applications, by Colin Webb and Julian Jones (Institute of Physics Publishing, 2004).

As used herein, the term "flexible package" refers to a package wherein 50-100% of the overall mass of the package (apart from any product(s)) is made from one or more flexible materials. Any of the packages disclosed herein can be a flexible package, wherein flexible material(s) form 50-100% of the overall mass of the package, or form any integer percentage between 50 and 100% of the overall mass, or form any range formed by any of these values, such as 60-100%, 70-100%, 80-100%, 90-100%, 95-100%, 50-95%, 50-90%, 50-80%, 50-70%, 50-60%, 60-95%, 70-90%, etc.

As used herein, the term "flexible material" refers to a thin, easily deformable, sheet-like material, having a flexibility factor within the range of 1,000-2,500,000 N/m. As examples, a flexible material may have a flexibility factor of 1,000-1,250,500 N/m, 1,000-750,700 N/m, 1,000-500,800 N/m, 1,000-250,900 N/m, 1,000-63,475 N/m, 1,000-25,990 N/m, 1,000-13,495 N/m, 13,495-1,250,500 N/m, 25,990-750,700 N/m, 63,475-500,800 N/m, 125,950-250-900 N/m, 13,495-2,500,000 N/m, 12,990-2,500,000 N/m, 63,475-2,500,000 N/m, 125,950-2,500,000 N/m, 250,900-2,500,000 N/m, 500,800-2,500,000 N/m, 750,700-2,500,000 N/m, 1,250,500-2,500,000 N/m, etc. Examples of materials that can be flexible materials include one or more of any of the following: films (such as plastic films), elastomers, foamed sheets, foils, fabrics (including wovens and nonwovens), biosourced materials, and papers, in any configuration, as separate material(s), or as layer(s) of a laminate (e.g. a multi-layered extruded film laminate), or as part(s) of a composite material, or in a microlayered or nanolayered structure, or with or without one or more of any suitable additives (such as perfumes, dyes, pigments, particles, agents, actives, fillers (e.g. fibers, reinforcing structures), etc.) and in any combination, as described herein or as known in the art.

A flexible material can be provided in the form of discrete sheets or continuous webs. When a discrete sheet of flexible material is used in the making process, the sheet can be sized for converting into one or more parts of a package blank, for converting into a single package blank, or for converting into multiple package blanks. When a continuous web of flexible material is used in the making process, any number of webs can be joined together in a single web and/or separated into different webs to provide flexible materials of appropriate size and properties. When a continuous web of flexible material is used in the making process, the web can be sized for converting into any number of package blanks in any orientation. In various embodiments, part or parts of a flexible material can also be provided in the form of small sections (i.e. patches), which can be attached to sheets and/or webs in any way known in the art (e.g. by a servo-driven patch placer).

The flexible materials used to make the flexible packages disclosed herein can be formed in any manner known in the art (e.g. films can be extruded or cast), and can be joined together using any kind of joining or sealing method known in the art, including, for example, heat sealing (e.g. conductive sealing, impulse sealing, ultrasonic sealing, etc.), welding, crimping, bonding, adhering, and the like, and combinations of any of these.

As used herein, when referring to a flexible package, the term "flexibility factor" refers to a material parameter for a thin, easily deformable, sheet-like material, wherein the parameter is measured in Newtons per meter, and the flexibility factor is equal to the product of the value for the Young's modulus of the material (measured in Pascals) and the value for the overall thickness of the material (measured in meters).

As used herein, the term "graphic" refers to a visual representation of an element intended to provide a decoration or to communicate information. Examples of graphics include one or more of any of the following: colors, patterns, designs, images (e.g. photographs, drawings, or other renderings), characters, branding, and the like. For any embodiment disclosed herein (including any alternative embodiments), any surface of a flexible package, can include one or more graphics of any size, shape, or configuration, disclosed herein or known in the art, in any combination.

As used herein, the term "indirectly connected" refers to a configuration wherein elements are attached to each other with one or more intermediate elements therebetween.

As used herein, the term "joined" refers to a configuration wherein elements are either directly connected or indirectly connected.

As used herein, the term "like-numbered" refers to similar alphanumeric labels for corresponding elements, as described below. Like-numbered elements have labels with the same last two digits; for example, one element with a label ending in the digits 20 and another element with a label ending in the digits 20 are like-numbered. Like-numbered elements can have labels with a differing first digit, wherein that first digit matches the number for its figure; as an example, an element of FIG. 3 labeled 320 and an element of FIG. 4A labeled 420 are like-numbered. Like-numbered elements can have labels with a suffix (i.e. the portion of the label following the dash symbol) that is the same or possibly different (e.g. corresponding with a particular embodiment); for example, a first embodiment of an element in FIG. 3A labeled 320-*a* and a second embodiment of an element in FIG. 3B labeled 320-*b*, are like numbered.

As used herein, the term "nearly" modifies a particular value, by referring to a range equal to the particular value, plus or minus five percent (+/−5%). The term "nearly" can also be used to modify a particular condition, by referring to a range of conditions that are within five percent (+/−5%) of the particular condition. For any of the embodiments of flexible packages, disclosed herein, any disclosure of a particular value or condition is also intended to be a disclosure of various alternative embodiments of that flexible package, with the value or condition being variable within the range of nearly (i.e. within 5%).

As used herein, the term "package" refers to any kind of package configured to enclose or contain any number or amount of any kind of product. Any of the packages described herein, may be used in various industries for a variety of products, including consumer products. For example, any embodiment of a package, as described herein may be used for any of the following products, any of which can take any product form described herein or known in the art: baby care products; beauty and grooming products; oral care products; health care products; fabric care products;

dish care products; cleaning and/or deodorizing products for home, commercial, and/or industrial use; and the like.

In various embodiments, part, parts, or all of a container may be made from one or more flexible materials. A container can enclose any number or amount of any kind of product, including any consumer product disclosed herein or known in the art. A container can be configured in any way known in the art and can take various forms, such as As used herein, when referring to a flexible material, the term "overall thickness" refers to a linear dimension measured perpendicular to the outer major surfaces of the sheet, when the sheet is lying flat. In various embodiments, any of the flexible materials disclosed herein can be configured to have an overall thickness 1-500 micrometers (μm), or any integer value for micrometers from 1-500, or within any range formed by any of these values, such as 10-500 μm, 20-400 μm, 30-300 μm, 40-200 μm, 50-100 μm, or 50-150 μm, etc.

As used herein, the term "substantially" modifies a particular value, by referring to a range equal to the particular value, plus or minus ten percent (+/−10%). The term "substantially" can also be used to modify a particular condition, by referring to a range of conditions that are within ten percent (+/−10%) of the particular condition. For any of the embodiments of flexible packages, disclosed herein, any disclosure of a particular value or condition is also intended to be a disclosure of various alternative embodiments of that flexible package, with the value or condition being variable within the range of substantially (i.e. within 10%).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or patent publication, is hereby incorporated herein by reference in its entirety unless expressly excluded or otherwise limited. The citation of any document is not an admission that it is prior art with respect to any document disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A package comprising:
   a flexible material comprising a polymeric film, wherein the flexible material defines an enclosed product volume a first panel formed from the flexible material, wherein at least a portion of the first panel is adjacent to a self-fold in the flexible material, and wherein the portion of the first panel adjacent to the self-fold is about flat; and
   a second panel formed from the flexible material, wherein at least a portion of the second panel is adjacent to the self-fold in the flexible material, and wherein the portion of the second panel adjacent to the self-fold is about flat;
   wherein the self-fold has an overall thickness that is about 5% to about 30% greater than a thickness of the flexible material outside of the self-fold;
   wherein the self-fold has a differential thermal-mechanical set than the flexible material outside of the self-fold;
   wherein the self-fold forms an angle of about 100 degrees to about 170 degrees between the first panel and the second panel; and
   wherein the angle faces away from the product volume.

2. The package of claim 1, wherein the self-fold has an overall thickness that is between about 5% and about 20% greater than the thickness of the flexible material outside of the self-fold.

3. The package of claim 1, wherein the self-fold has a degree of prestrain that is about 30% to about 100% less than a degree of prestrain in the flexible material outside of the self-fold.

4. The package of claim 1, wherein the angle is about 110 degrees to about 160 degrees between the first panel and the second panel.

5. The package of claim 1 comprising:
   an energy absorbing material locally disposed at the self-fold;
   wherein the flexible material has a first degree of energy absorption for a particular activation energy; and
   wherein the energy absorbing material has a second degree of energy absorption for the particular activation energy; and
   wherein the second degree of energy absorption is greater than the first degree of energy absorption.

6. The package of claim 5, wherein the particular activation energy is laser energy having a wavelength of 150 nanometers to 1 millimeter.

7. The package of claim 5, wherein the particular activation energy is microwave energy having a wavelength of 1 millimeter to 1 meter.

8. The package of claim 1 comprising:
   an energy absorbing material globally disposed on the flexible material;
   wherein the flexible material has a first degree of energy absorption for a particular activation energy;
   wherein the energy absorbing material has a second degree of energy absorption for the particular activation energy; and
   wherein the second degree of energy absorption is greater than the first degree of energy absorption.

9. The package of claim 8, wherein the particular activation energy is laser energy having a wavelength of 150 nanometers to 1 millimeter.

10. The package of claim 8, wherein the particular activation energy is microwave energy having a wavelength of 1 millimeter to 1 meter.

11. The package of claim 1, wherein the flexible material comprises a first film joined to a second film, wherein the first film has a first degree of energy absorption for a particular activation energy, wherein the second film has a second degree of energy absorption for the particular activation energy, and wherein the second degree of energy absorption is greater than the first degree of energy absorption.

12. The package of claim 11, wherein the first film is PE.

13. The package of claim 11, wherein the second film is PET.

14. The package of claim 11, wherein the particular activation energy is laser energy having a wavelength of 150 nanometers to 1 millimeter.

15. The package of claim 11, wherein the particular activation energy is microwave energy having a wavelength of 1 millimeter to 1 meter.

16. The package of claim 1, comprising a shielding material locally applied to the flexible material, wherein the shielding material is disposed on a side of the flexible material opposite the angle.

17. The package of claim 16, wherein the shielding material comprises a metallization layer.

18. A package comprising:
- a flexible material comprising a polymeric film, wherein the flexible material defines an enclosed product volume;
- a first panel formed from the flexible material, wherein at least a part of the first panel is adjacent to a self-fold in the flexible material, and wherein the part of the first panel adjacent to the self-fold is about flat;
- a second panel formed from the flexible material, wherein at least a part of the second panel is adjacent to the self-fold in the flexible material, and wherein the part of the second panel adjacent to the self-fold is about flat; and
- wherein the self-fold has a different thermal-mechanical set than the flexible material outside of the self-fold;
- wherein the self-fold forms an angle of about 100 degrees to about 170 degrees between the first panel and the second panel; and
- wherein a vertex of the angle is disposed inboard of the first panel and the second panel relative to the product volume.

19. The package of claim 18, comprising a shielding material locally applied to the flexible material, wherein the shielding material is disposed on a side of the flexible material opposite the angle.

20. A package comprising:
- a flexible material comprising a polymeric film, wherein the flexible material defines an enclosed product volume;
- a first panel formed from the flexible material, wherein at least a portion of the first panel is adjacent to a self-fold in the flexible material, and wherein the portion of the first panel adjacent to the self-fold is about flat; and
- a second panel formed from the flexible material, wherein at least a portion of the second panel is adjacent to the self-fold in the flexible material, and wherein the portion of the second panel adjacent to the self-fold is about flat;
- wherein the self-fold has an overall thickness that is about 5% to about 30% greater than a thickness of the flexible material outside of the self-fold;
- wherein the self-fold has a differential thermal-mechanical set than the flexible material outside of the self-fold;
- wherein the self-fold forms an angle of about 100 degrees to about 170 degrees between the first panel and the second panel; and
- wherein the angle faces toward from the product volume.

* * * * *